(12) United States Patent
Shimizu et al.

(10) Patent No.: US 12,177,388 B2
(45) Date of Patent: Dec. 24, 2024

(54) RECORDING APPARATUS INCLUDING READING UNIT FOR CHECKING NOZZLE CHECK PATTERN

(71) Applicant: SEIKO EPSON CORPORATION, Tokyo (JP)

(72) Inventors: Yuka Shimizu, Shimosuwa-Machi (JP); Shintaro Miyamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/193,276

(22) Filed: Mar. 30, 2023

(65) Prior Publication Data
US 2023/0328185 A1    Oct. 12, 2023

(30) Foreign Application Priority Data

Apr. 1, 2022    (JP) .................................. 2022-061687

(51) Int. Cl.
*H04N 1/04* (2006.01)
*H04N 1/00* (2006.01)
*H04N 1/028* (2006.01)

(52) U.S. Cl.
CPC ..... *H04N 1/00013* (2013.01); *H04N 1/00519* (2013.01); *H04N 1/00588* (2013.01); *H04N 1/0071* (2013.01); *H04N 1/0079* (2013.01); *H04N 1/02835* (2013.01)

(58) Field of Classification Search
None
See application file for complete search history.

(56) References Cited

U.S. PATENT DOCUMENTS

| | | | |
|---|---|---|---|
| 10,148,834 B1* | 12/2018 | Morita | H04N 1/1061 |
| 2008/0278528 A1* | 11/2008 | Kim | B41J 13/0045 |
| | | | 347/12 |
| 2008/0291230 A1 | 11/2008 | Na | |
| 2009/0141314 A1 | 6/2009 | Yamamoto | |
| 2019/0291445 A1 | 9/2019 | Yamada | |
| 2020/0099811 A1 | 3/2020 | Shimazu | |
| 2020/0137249 A1* | 4/2020 | Kawabata | H04N 1/00793 |
| 2020/0369038 A1* | 11/2020 | Miyazawa | B41J 29/02 |
| 2021/0099594 A1* | 4/2021 | Ochi | H04N 1/00615 |
| 2022/0239792 A1* | 7/2022 | Tsuyama | H04N 1/0083 |
| 2022/0315373 A1* | 10/2022 | Oda | B41J 25/34 |

FOREIGN PATENT DOCUMENTS

| | | |
|---|---|---|
| JP | 2009-132020 A | 6/2009 |
| JP | 2019-166728 A | 10/2019 |
| JP | 2020-050520 A | 4/2020 |
| JP | 2021-057826 A | 4/2021 |

* cited by examiner

*Primary Examiner* — Dung D Tran
(74) *Attorney, Agent, or Firm* — WORKMAN NYDEGGER

(57) ABSTRACT

A recording apparatus includes a reading unit reading a medium transported through a medium transportation path and a pair of frames supporting the reading unit. The pair of frames includes a first frame and a second frame that is disposed with an interval provided between the first frame and the second frame in the width direction, at least one of the first frame and the second frame is provided with an opening portion penetrable by the reading unit, and the first frame and the second frame support the reading unit penetrating, via the opening portion, the first frame and the second frame while being disposed between the first frame and the second frame.

17 Claims, 25 Drawing Sheets

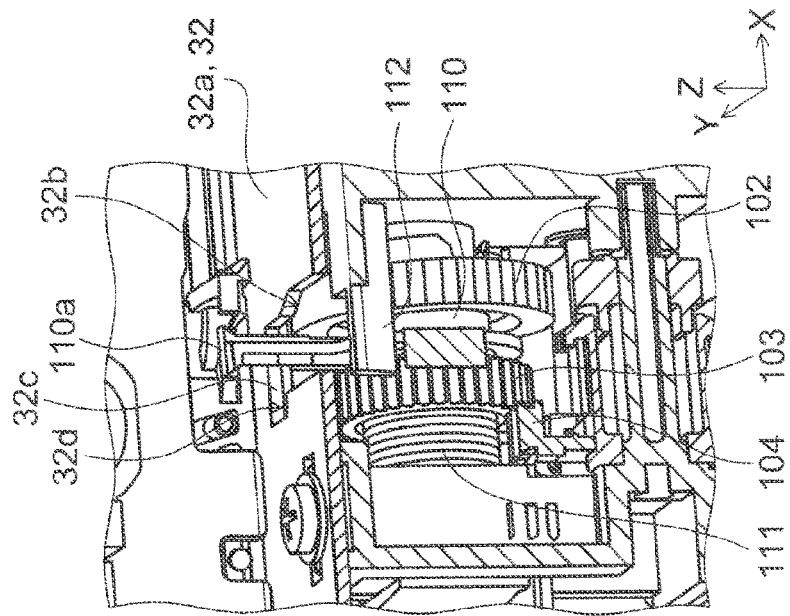
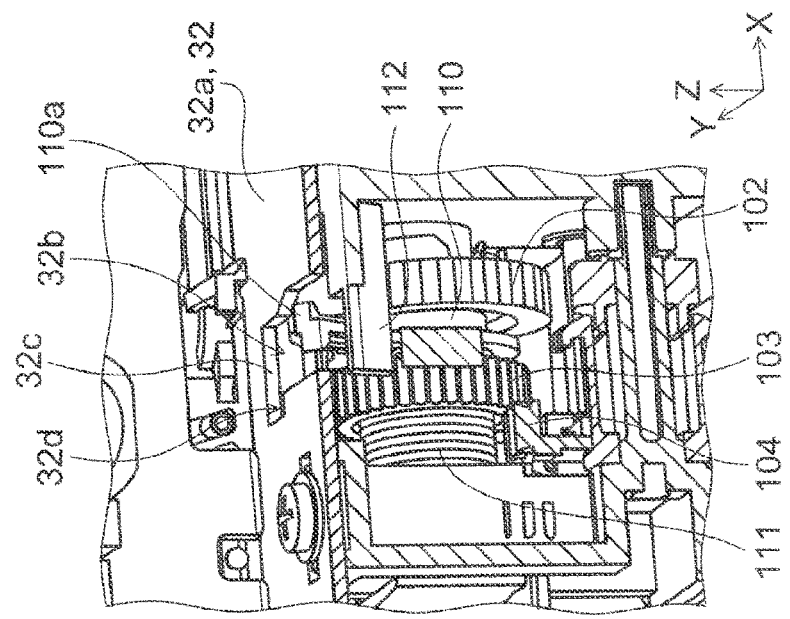

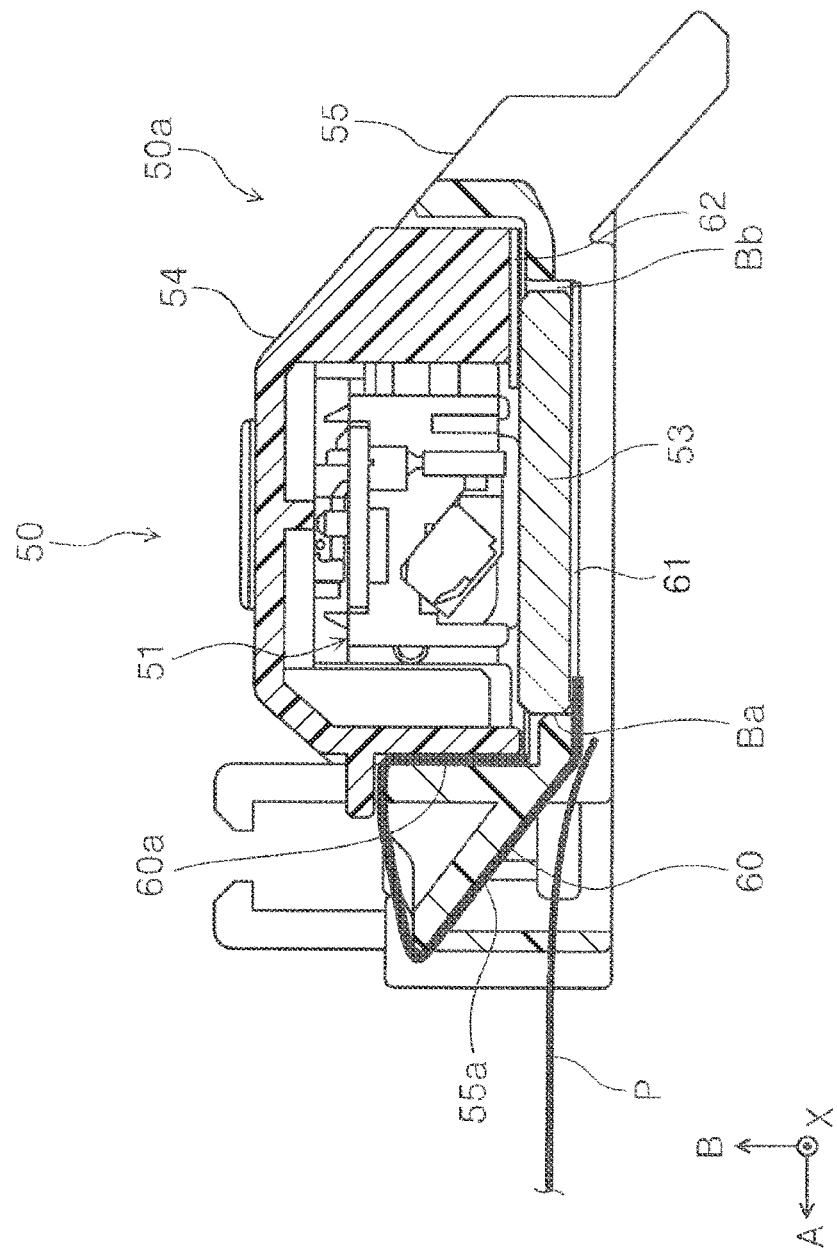

RECORDING APPARATUS INCLUDING READING UNIT FOR CHECKING NOZZLE CHECK PATTERN

The present application is based on, and claims priority from JP Application Serial Number 2022-061687, filed Apr. 1, 2022, the disclosure of which is hereby incorporated by reference herein in its entirety.

BACKGROUND

1. Technical Field

The present disclosure relates to a recording apparatus that performs recording on a medium.

2. Related Art

In a printer described in JP-A-2021-57826, when an image is to be formed on a second surface of a sheet of which a first surface has an image formed thereon, the sheet is fed from a first transportation path to a second transportation path and then is returned to the first transportation path after being inverted so that an image is formed on the second surface. A reader is provided in the second transportation path, and the sheet transported along the second transportation path is read by the reader.

Although depending on the configuration of a recording apparatus, a configuration may be adopted in which a medium transportation path is formed between a pair of frames and a reading unit is supported by the pair of frames. When the reading unit is to be supported by the pair of frames, a configuration in which the pair of frames is provided with notches and the reading unit is dropped into the notches from above may result in a decrease in rigidity of the pair of frames because of the formation of the notches.

SUMMARY

According to an aspect of the present disclosure, there is provided a recording apparatus including a recorder performing recording on a medium, a medium transportation path through which the medium after the recording performed thereon by the recorder is transported, a reading unit that is a unit extending in a width direction intersecting a medium transportation direction of the medium transported through the medium transportation path and that reads the medium transported through the medium transportation path, and a pair of frames supporting the reading unit. The pair of frames includes a first frame and a second frame that is disposed with an interval provided between the first frame and the second frame in the width direction, at least one of the first frame and the second frame is provided with an opening portion penetrable by the reading unit, and the first frame and the second frame support the reading unit penetrating, via the opening portion, the first frame and the second frame while being disposed between the first frame and the second frame.

BRIEF DESCRIPTION OF THE DRAWINGS

FIG. 1A is a view as seen from an apparatus front side and FIG. 1B is a view as seen from an apparatus rear side.

FIGS. 7A and 7B are perspective views of the power transmitter, where FIG. 7A is a view showing a forward rotation state of a transportation driving roller, and FIG. 7B is a view showing a backward rotation state of the transportation driving roller.

FIG. 17A is a view showing a state where the reading unit is attached,
and
FIG. 17B is a view showing a state where the reading unit is removed.

FIG. 18A is a view showing a state where the reading unit is attached, and FIG. 18B is a view showing a state where the reading unit is removed.

FIG. 24A is a view showing an end portion in a +X direction and FIG. 24B is a view showing an end portion in a −X direction.

FIG. 25 is a cross-sectional view of the reading unit cut along an A-B plane.

DESCRIPTION OF EXEMPLARY EMBODIMENTS

Figure 1A:
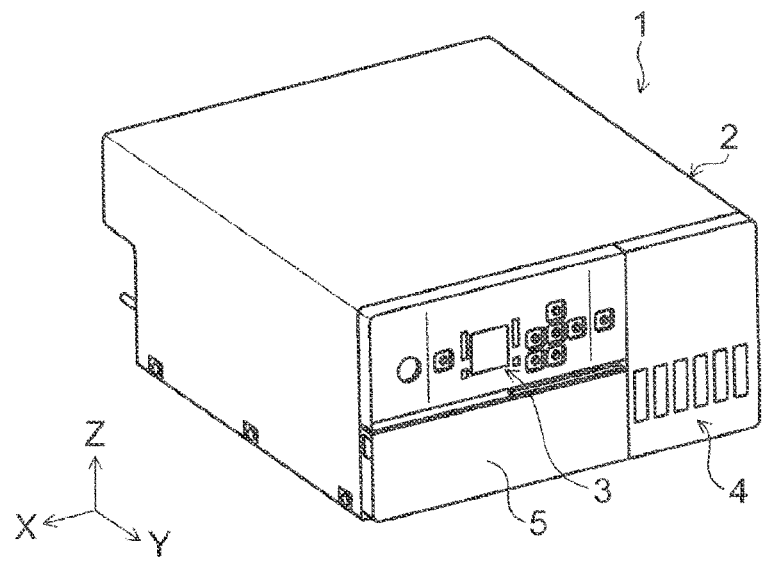
FIGS. 1A and 1B are external perspective views of a printer according to an aspect of the present disclosure, where

Hereinafter, the present disclosure will be schematically described.

A first aspect of the present disclosure provides a recording apparatus including a recorder performing recording on a medium, a medium transportation path through which the medium after the recording performed thereon by the recorder is transported, a reading unit that is a unit extending in a width direction intersecting a medium transportation direction of the medium transported through the medium transportation path and that reads the medium transported through the medium transportation path, and a pair of frames supporting the reading unit. The pair of frames includes a first frame and a second frame that is disposed with an interval provided between the first frame and the second frame in the width direction, at least one of the first frame and the second frame is provided with an opening portion penetrable by the reading unit, and the first frame and the second frame support the reading unit penetrating, via the opening portion, the first frame and the second frame while being disposed between the first frame and the second frame.

In this case, since at least one of the first frame and the second frame is provided with the opening portion penetrable by the reading unit and the first frame and the second frame support the reading unit penetrating, via the opening portion, the first frame and the second frame while being disposed between the first frame and the second frame, the rigidities of the first frame and the second frame can be secured in comparison with a configuration in which upper portions of the first frame and the second frame are provided with notches and the reading unit is dropped into the notches from above.

A second aspect of the present disclosure provides the recording apparatus according to the first aspect, in which a distance between the first frame and the second frame in the width direction is smaller than a length of the reading unit in the width direction.

In this case, since the distance between the first frame and the second frame in the width direction is smaller than the length of the reading unit in the width direction, it is possible to suppress an increase in cost in comparison with a configuration in which the reading unit is supported by the first frame and the second frame via another member. In addition, since the distance between the first frame and the second frame can be shortened within a range in which the medium can be transported, it is possible to contribute to reduction in apparatus size.

A third aspect of the present disclosure provides the recording apparatus according to the second aspect, in which both of the first frame and the second frame are provided with the opening portion.

In this case, since both of the first frame and the second frame are provided with the opening portion, the posture of the reading unit is stabilized.

A fourth aspect of the present disclosure provides the recording apparatus according to the third aspect, in which the reading unit includes a reading sensor reading a medium, and a size, in the width direction, of a medium readable by the reading sensor is larger than that of a medium transportation region in the medium transportation path.

In this case, since the size, in the width direction, of the medium readable by the reading sensor is larger than that of the medium transportation region in the medium transportation path, the size of the reading sensor does not need to match the medium transportation region in the medium transportation path. Accordingly, the degree of freedom in selecting the reading sensor is improved, the cost of the reading sensor can be suppressed, and thus it is possible to contribute a decrease in cost of the entire apparatus.

A fifth aspect of the present disclosure provides the recording apparatus according to the fourth aspect, in which the reading unit includes a housing structure accommodating the reading sensor, and the housing structure includes a glass plate interposed between the medium transportation path and the reading sensor, a first housing member holding the reading sensor, and a second housing member that is a member facing the first housing member and that holds the glass plate.

In this case, since the reading sensor is accommodated in such the housing structure, a decrease in reading accuracy caused by adhesion of foreign substances to the reading sensor can be suppressed.

A sixth aspect of the present disclosure provides the recording apparatus according to the fifth aspect, in which the second housing member includes a contact portion configured to come into contact with the reading unit, and the reading sensor is accommodated to be movable forward and backward with respect to the contact portion and is pressed against the contact portion by a pressing member.

In this case, since the reading sensor is accommodated to be movable forward and backward with respect to the contact portion and is pressed against the contact portion by the pressing member, the position of the reading sensor with respect to the glass plate is stabilized and there is improvement in reading accuracy.

A seventh aspect of the present disclosure provides the recording apparatus according to the fifth aspect, in which the second housing member includes a covering portion covering a region that is a portion of the reading sensor in the width direction and that is outside the medium transportation region in the medium transportation path.

In this case, since the second housing member includes the covering portion covering the region that is a portion of the reading sensor in the width direction and that is outside the medium transportation region in the medium transportation path, the area of the glass plate can be made small and it is possible to suppress an increase in cost.

An eighth aspect of the present disclosure provides the recording apparatus according to the seventh aspect, in which a portion of the covering portion overlaps with a portion of the glass plate as seen in a normal direction of a surface of the glass plate.

In this case, since a portion of the covering portion overlaps with a portion of the glass plate as seen in the normal direction of the glass plate, foreign substances entering the inside of the housing structure via a gap between the glass plate and the covering portion can be suppressed.

A ninth aspect of the present disclosure provides the recording apparatus according to the eighth aspect, in which the second housing member and the glass plate are bonded to each other by means of a glass plate bonding double-sided tape, and at least a portion of the glass plate bonding double-sided tape is interposed between the covering portion and the glass plate.

In this case, since the second housing member and the glass plate are bonded to each other by means of the double-sided tape, the second housing member and the glass plate can be easily bonded to each other. Since at least a portion of the double-sided tape is interposed between the covering portion and the glass plate, foreign substances entering the inside of the housing structure via a gap between the glass plate and the covering portion can be suppressed.

A tenth aspect of the present disclosure provides the recording apparatus according to any one of the fifth to ninth aspects, in which the first housing member and the second housing member are bonded to each other by means of a housing member bonding double-sided tape.

In this case, since the first housing member and the second housing member are bonded to each other by means of the housing member bonding double-sided tape, the first housing member and the second housing member can be easily bonded to each other and foreign substances entering the inside of the housing structure via a gap between the first housing member and the second housing member can be suppressed.

An eleventh aspect of the present disclosure provides the recording apparatus according to the fifth aspect, in which the second housing member includes a guide portion guiding a medium to a position where the medium is read by the reading sensor, and the guide portion is provided with a sheet material of which a coefficient of friction with the medium is lower than that of the second housing member.

In this case, since the second housing member includes the guide portion guiding the medium to the position where the medium is read by the reading sensor, passage can be made smoothly when the medium passes through the position of the second housing member in the medium transportation path. In addition, since the guide portion is provided with the sheet material of which the coefficient of friction with the medium is lower than that of the second housing member, passage can be made further smoothly when the medium passes through the position of the second housing member in the medium transportation path.

A twelfth aspect of the present disclosure provides the recording apparatus according to the eleventh aspect, in which a portion of the sheet material is interposed between the first housing member and the second housing member.

In this case, since a portion of the sheet material is interposed between the first housing member and the second housing member, the sheet material falling off from the second housing member can be suppressed.

A thirteenth aspect of the present disclosure provides the recording apparatus according to the eleventh aspect or the twelfth aspect, in which a portion of the sheet material covers at least a portion of a boundary between the second housing member and the glass plate.

In this case, since a portion of the sheet material covers at least a portion of a boundary between the second housing member and the glass plate, foreign substances entering the inside of the housing structure via the boundary between the second housing member and the glass plate can be suppressed.

A fourteenth aspect of the present disclosure provides the recording apparatus according to the first aspect, in which the recorder is configured to record a recorded image used to check a state of liquid ejection by ejecting liquid on a medium, and the reading unit reads the medium with the recorded image recorded thereon.

In this case, since the recorder is configured to record the recorded image used to check the state of liquid ejection by ejecting the liquid on the medium and the reading unit reads the medium with the recorded image recorded thereon, the recording apparatus self-diagnoses the state of liquid ejection of the recorder, so that continuation of recording performed in a state where the state of liquid ejection is unfavorable can be suppressed.

A fifteenth aspect of the present disclosure provides the recording apparatus according to the fourteenth aspect, in which the medium transportation path is as a reading path, and the recording apparatus further includes, separately from the reading path, a recording path that is a path for transportation of a medium and that passes the recorder, a feeding path that is a path coupled to the recording path and through which the medium is fed to the recording path, and a discharge path that is a path coupled to the recording path and through which the medium after recording performed thereon by the recorder is discharged.

In this case, since the reading path is a medium transportation path provided independently of the recording path, the feeding path, and the discharge path, a medium after normal recording performed thereon passes through the discharge path and a medium with the recorded image recorded thereon passes through the reading path, the recorded image being used to check the state of liquid ejection of the recorder. In addition, a medium before recording performed thereon passes through the feeding path. Accordingly, the reading unit is less likely to be stained and the state of liquid ejection of the recorder can be appropriately checked.

According to a sixteenth aspect, there is provided a reading unit which penetrates a first frame and a second frame via an opening portion formed in at least one of the first frame and the second frame while being disposed between the first frame and the second frame so as to be supported by the first frame and the second frame and which reads a medium transported along a medium transportation path in a recording apparatus including a recorder performing recording on a medium, the medium transportation path through which the medium after the recording performed thereon by the recorder is transported, and the first frame and the second frame that form a pair of frames and that are disposed at an interval in a width direction intersecting a medium transportation direction of the medium transported through the medium transportation path, the reading unit including a reading sensor that reads the medium and that is larger than a medium transportation region in the medium transportation path, and a housing structure accommodating the reading sensor. The housing structure includes a glass plate interposed between the medium transportation path and the reading sensor, a first housing member holding the reading sensor, and a second housing member that is a member facing the first housing member and that holds the glass plate and the second housing member includes a covering portion covering a region that is a portion of the reading sensor in the width direction and that is outside the medium transportation region in the medium transportation path.

In this case, since the second housing member includes the covering portion covering the region that is a portion of the reading sensor in the width direction and that is outside a reading region where the largest medium transportable through the medium transportation path is read, the area of the glass plate can be made small and it is possible to suppress an increase in cost.

Hereinafter, the present disclosure will be specifically described.

In the following description, an ink jet printer 1 will be described as an example of the recording apparatus. Hereinafter, the ink jet printer 1 will be simply referred to as a printer 1.

Note that, regarding the X-Y-Z coordinate system shown in each drawing, an X-axis direction is an apparatus width direction and is a width direction of a medium on which recording is performed. A +X direction is a direction to the left side and a −X direction is a direction to the right side as seen from an operator of the printer 1.

A Y-axis direction is an apparatus depth direction and is a direction along a medium transportation direction at the time of recording. A +Y direction is a direction from an apparatus rear surface to an apparatus front surface, and a −Y direction is a direction from the apparatus front surface to the apparatus rear surface. In the present embodiment, of side surfaces constituting the periphery of the printer 1, a side surface provided with an operation portion 3 (that is, a side surface in the +Y direction) is the apparatus front surface and a side surface in the −Y direction is the apparatus rear surface.

A Z-axis direction is a direction along the vertical direction and is an apparatus height direction. A +Z direction is a vertically upward direction, and a −direction is a vertically downward direction.

In some of the drawings, an A-axis direction and a B-axis direction are shown. The A-axis direction is a direction in which a path portion of a reading path T5 that faces a reading unit 50 extends and a +A direction is a direction including a +Y direction component and a −direction component. The B-axis direction is a direction orthogonal to the A-axis direction, and a +B direction is a direction including the +Y direction component and a +Z direction component.

Note that, in the following description, a direction in which a medium is fed may be referred to as "a downstream direction", and the direction opposite thereto may be referred to as "an upstream direction".

In FIG. 1A, the printer 1 includes the operation portion 3 for various operation settings, the operation portion 3 being provided on a front surface of an apparatus main body 2 that performs ink jet recording on a medium typified by a recording sheet. A remaining ink amount display portion 4 is provided on the front surface of the apparatus main body 2.

A reference numeral "5" represents a front surface cover that can be opened and closed, the front surface cover being provided to be rotatable around a rotary shaft 5a (refer to FIG. 2) with respect to a medium cassette 8 which will be described later and constituting a portion of a paper discharge tray when being opened.

Figure 1B:
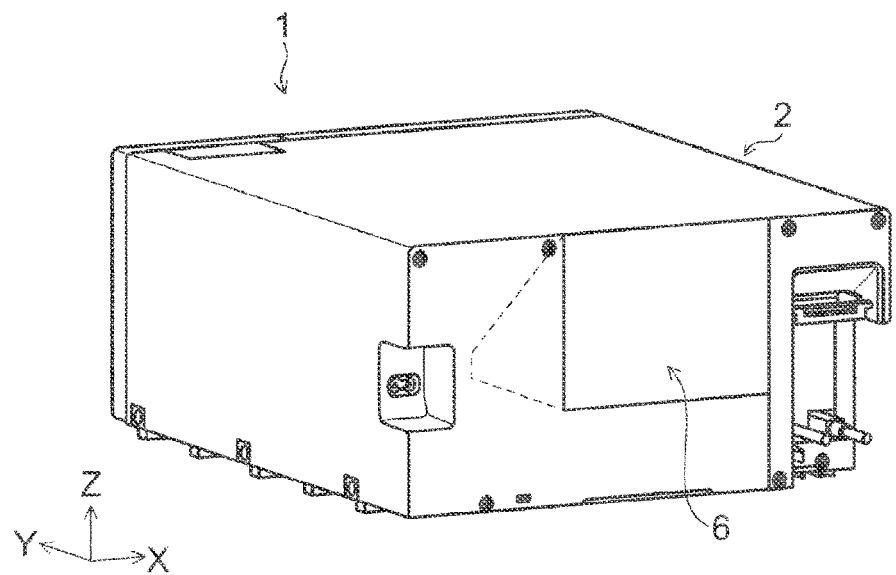

In FIG. 1B, an inversion unit 6 (refer to FIG. 9 as well) is provided on the rear surface of the apparatus main body 2 to be detachable from the apparatus main body 2. The inversion unit 6 integrally includes an inversion roller 15 and a pressing portion 72 (refer to FIG. 2), which will be described later.

Figure 2:
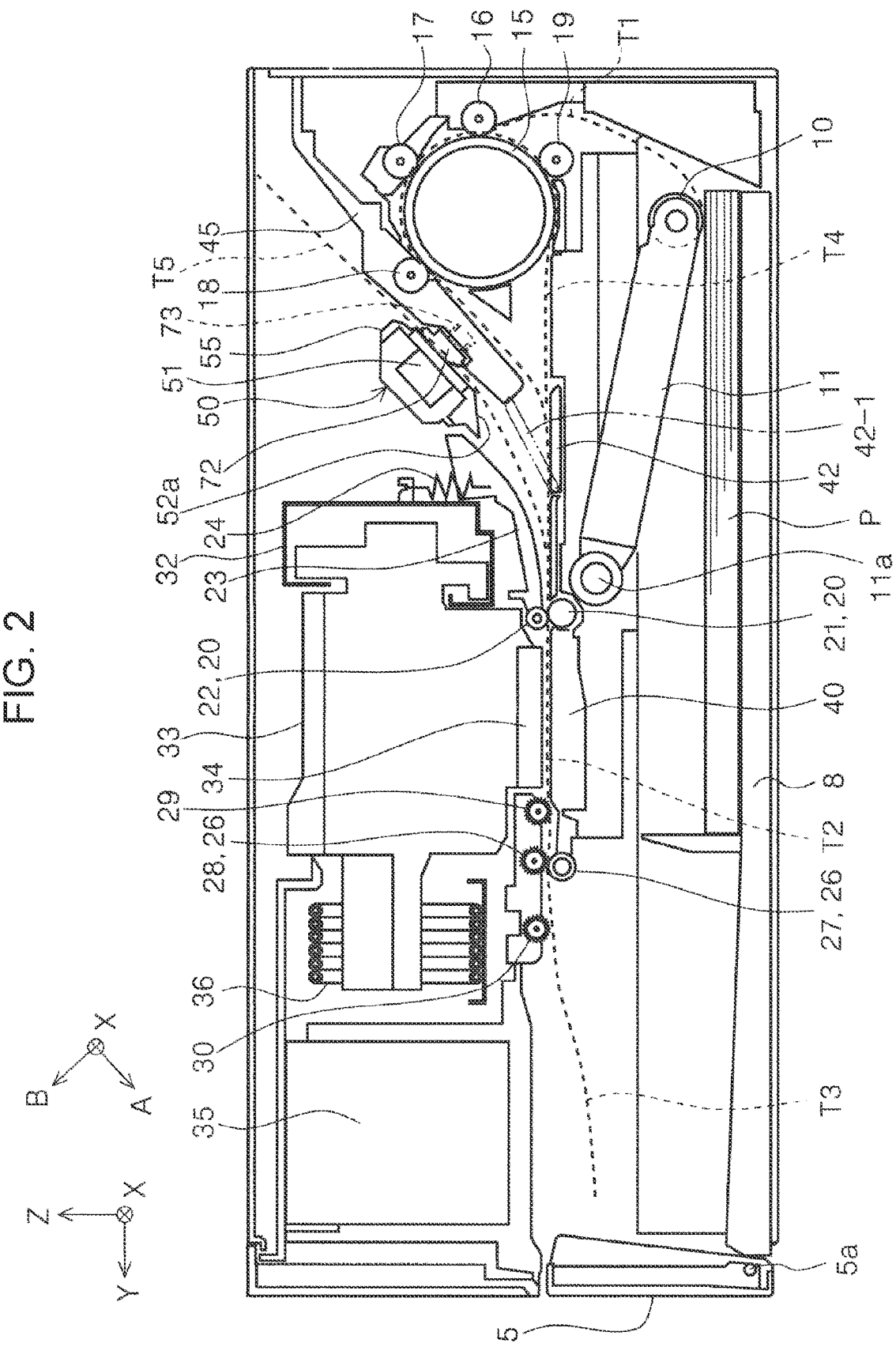
FIG. 2 is a showing the entire medium transportation path of the printer according to the aspect of the present disclosure.

Next, a medium transportation path in the printer 1 will be described with reference to FIG. 2. In FIG. 2, the medium transportation path is represented by broken lines. As the medium transportation path for transportation of a medium, the printer 1 includes a feeding path T1 used when the medium is to be fed from the medium cassette 8 provided at an apparatus bottom portion, a recording path T2 passing a position facing a recording head 34, a discharge path T3 through which a medium after recording performed thereon is discharged, an inversion path T4 through which a medium after recording performed thereon is fed to the inversion roller 15, and the reading path T5 to which a medium with a nozzle check pattern recorded thereon is fed. The nozzle check pattern is an example of a recorded image used to check the state of ejection of ink from the recording head 34.

In the present example, the feeding path T1 is a path extending from a pick roller 10 to a transportation roller pair 20 via the inversion roller 15.

The recording path T2 is a path extending from the transportation roller pair 20 to a discharge roller pair 26. In the present embodiment, the recording path T2 extends along the Y-axis direction (that is, the apparatus depth direction). That is, the recording path T2 extends along a horizontal direction.

The discharge path T3 is a path extending downstream (in the +Y direction) from the discharge roller pair 26.

The inversion path T4 is a path that extends from the transportation roller pair 20 and that extends back to the transportation roller pair 20 via the inversion roller 15.

The reading path T5 is a path that is closer to a side to which the −Y direction extends than the transportation roller pair 20 is, and is a path that passes a space between the reading unit 50 and the pressing portion 72.

In the feeding path T1, a medium is fed, by the pick roller 10, in the −Y direction from the medium cassette 8 as a medium accommodation portion. The medium cassette 8 is provided to be detachable from the apparatus main body 2. In FIG. 2, a reference numeral "P" represents a medium accommodated in the medium cassette 8.

The pick roller 10 is supported by a roller supporting portion 11 that is rotatable around a rotary shaft 11a and moves forward and backward with respect to the medium accommodated in the medium cassette 8 as the roller supporting portion 11 rotates. The pick roller 10 rotates in a counterclockwise direction in FIG. 2 by means of power received from a transportation motor 91 (refer to FIG. 3).

The medium fed in the −Y direction by the pick roller 10 is curved and inverted by the inversion roller 15 and is fed toward the transportation roller pair 20.

Figure 3:
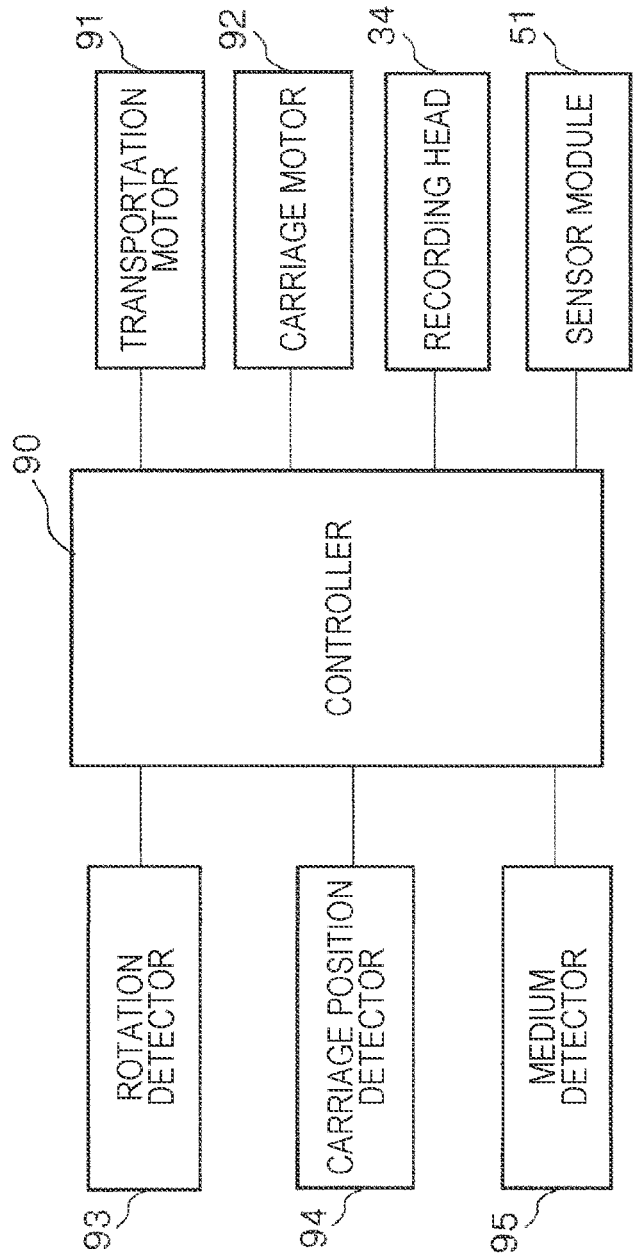
FIG. 3 is a block diagram showing a control system of the printer according to the aspect of the present disclosure.

The inversion roller 15 rotates in the counterclockwise direction in FIG. 2 by means of power received from the transportation motor 91 (refer to FIG. 3). A first driven roller 16, a second driven roller 17, a third driven roller 18, and a fourth driven roller 19 are provided in the vicinity of the inversion roller 15. A medium fed from the medium cassette 8 by the pick roller 10 is and fed downstream while being nipped by the inversion roller 15, the first driven roller 16, the second driven roller 17, and the third driven roller 18.

The transportation roller pair 20 provided in the recording path T2 includes a transportation driving roller 21 and a transportation driven roller 22. The transportation driving roller 21 rotates forward and backward by means of power received from the transportation motor 91 (refer to FIG. 3). In the present specification, forward rotation of the transportation driving roller 21 is counterclockwise rotation of the transportation driving roller 21 in FIG. 2 and rotation performed when a medium is to be fed in the +Y direction. In addition, such rotation may be referred to as forward rotation of the transportation roller pair 20. In addition, rotation of the transportation motor 91 (refer to FIG. 3) in this case may be referred to as forward rotation of the transportation motor 91.

In addition, in the present specification, backward rotation of the transportation driving roller 21 is clockwise rotation of the transportation driving roller 21 in FIG. 2 and rotation performed when a medium is to be fed in the −Y direction. In addition, such rotation may be referred to as backward rotation of the transportation roller pair 20. In addition, rotation of the transportation motor 91 (refer to FIG. 3) in this case may be referred to as backward rotation of the transportation motor 91.

The transportation driven roller 22 is driven to rotate with a medium nipped between the transportation driven roller 22 and the transportation driving roller 21. The transportation driven roller 22 is supported by a roller supporting member 23. The roller supporting member 23 is provided to be rotatable around a rotary shaft (not shown), and the transportation driven roller 22 moves forward and backward with respect to the transportation driving roller 21 as the roller supporting member 23 rotates. A reference numeral "24" represents a tension spring which is an example of a pressing member that presses the roller supporting member 23 such that the transportation driven roller 22 is pressed against the transportation driving roller 21.

The recording head 34, which is an example of a recorder, and a supporting member 40 are disposed downstream of the transportation roller pair 20 in the recording path T2 such that the recording head 34 and the supporting member 40 face each other. In the present embodiment, the recording head 34 is configured as an ink jet recording head that ejects ink. To the recording head 34, ink is supplied from an ink tank 35 via an ink tube 36.

The supporting member 40 supports a medium so that a gap between the recording head 34 and the medium is defined.

A carriage 33 provided with the recording head 34 is provided to be movable in the X-axis direction (that is, in a medium width direction) with a carriage motor 92 (refer to FIG. 3) serving as a power source.

A main frame 32 is provided in the −Y direction with respect to the carriage 33, and the carriage 33 moves in the X-axis direction while being supported by the main frame 32.

The discharge roller pair 26 is provided downstream of the recording head 34 and the supporting member 40 in the recording path T2. A discharge driving roller 27 rotates forward and backward by means of power received from the transportation motor 91 (refer to FIG. 3). In the present specification, forward rotation of the discharge driving roller 27 is counterclockwise rotation of the discharge driving roller 27 in FIG. 2 and rotation performed when a medium is to be fed in the +Y direction. In addition, such rotation may be referred to as forward rotation of the discharge roller pair 26.

In addition, in the present specification, backward rotation of the discharge driving roller 27 is clockwise rotation of the discharge driving roller 27 in FIG. 2 and rotation performed when a medium is to be fed in the −Y direction. In addition, such rotation may be referred to as backward rotation of the discharge roller pair 26.

A discharge driven roller 28 is provided to be movable forward and backward with respect to the discharge driving roller 27, is pressed toward the discharge driving roller 27 by a spring (not shown), and is driven to rotate with a medium nipped between the discharge driven roller 28 and the discharge driving roller 27. A medium after recording performed thereon is discharged in the +Y direction by the discharge roller pair 26.

Note that a restriction roller 29 is provided upstream of the discharge roller pair 26 while being provided in the vicinity of the discharge roller pair 26, a restriction roller 30 is provided downstream of the discharge roller pair 26 while being provided in the vicinity of the discharge roller pair 26, and a medium to be discharged is restricted from rising upward by the restriction rollers 29 and 30.

Note that, in FIG. 3, a controller 90 can figure out, based on detection information of a rotation detector 93, the amounts of rotation of the pick roller 10, the inversion roller 15, the transportation driving roller 21, and the discharge driving roller 27. The rotation detector 93 detects the amount of rotation of the transportation motor 91, and can be composed of, for example, a rotary encoder.

In addition, the controller 90 can figure out, based on detection information of a carriage position detector 94, the position of the carriage 33 in the X-axis direction. The carriage position detector 94 can be composed of, for example, a linear encoder.

Figure 10:
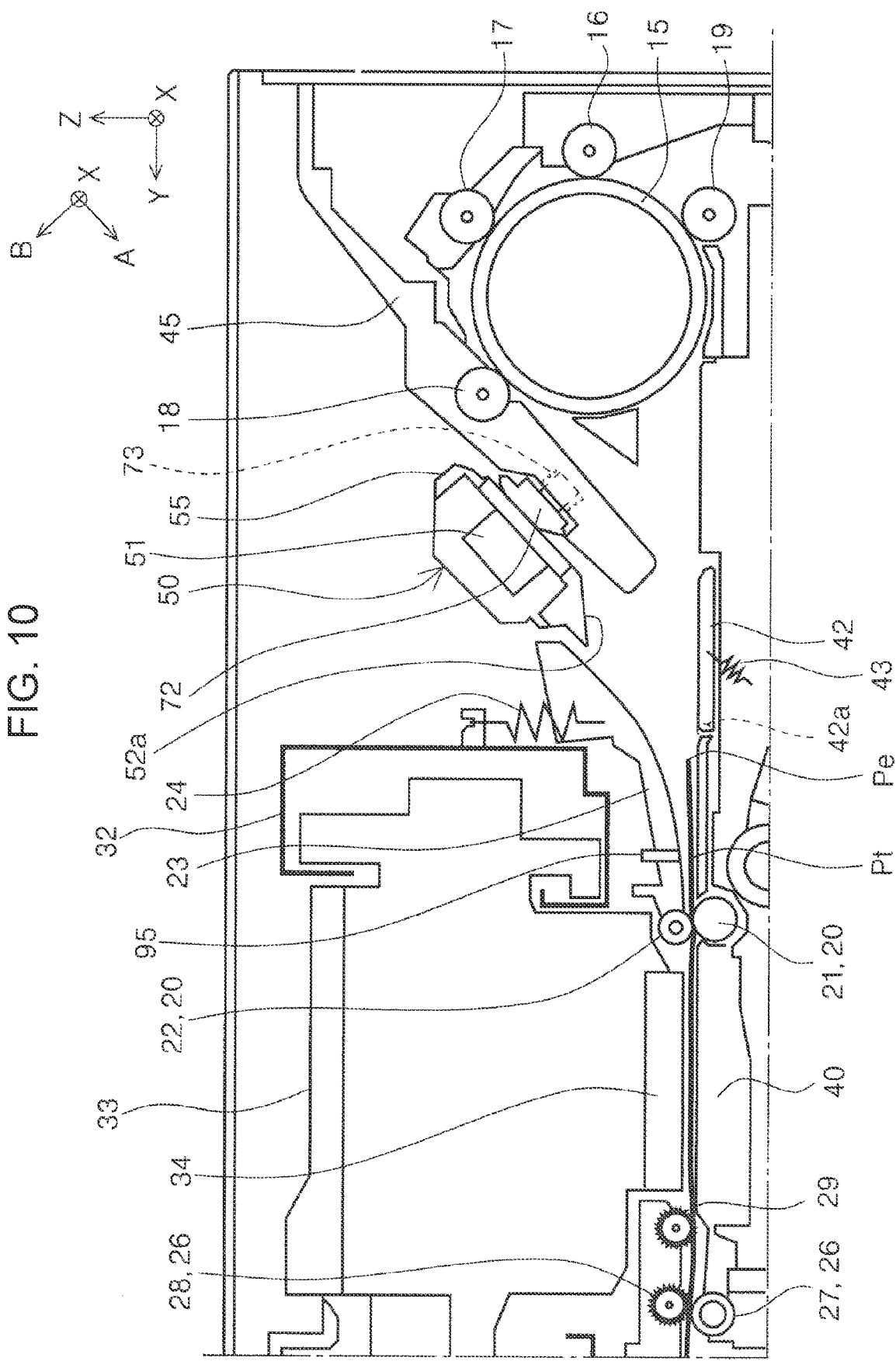
FIG. 10 is a view showing a portion of the medium transportation path with a switching flap being in a first state.

In addition, the controller 90 can figure out, based on detection information of a medium detector 95, that a leading end of a medium has reached the vicinity of the transportation roller pair 20 and is upstream of the transportation roller pair 20 (refer to FIG. 10). The medium detector 95 can be composed of an optical sensor or a contact-type sensor disposed in the vicinity of the transportation roller pair 20 while being closer to a side to which the −Y direction extends than the transportation roller pair 20 is.

Referring again to FIG. 2, when recording is to be performed on a second surface of a medium which is opposite to a first surface of the medium, the controller 90 (refer to FIG. 3) controlling the transportation motor 91 causes the transportation motor 91 to rotate backward so that the medium is fed to the inversion path T4. In this case, the medium is nipped by the inversion roller 15 and the fourth driven roller 19, and is fed downstream while being nipped by the inversion roller 15, the first driven roller 16, the second driven roller 17, and the third driven roller 18. The medium transported to the inversion path T4 is inverted by the inversion roller 15 such that the second surface faces the recording head 34 and then is fed to the recording path T2.

Note that, in the present embodiment, a medium after recording performed thereon is fed back in the −Y direction to return to the feeding path T1 side and then enters the inversion path T4. However, the position of the inversion path T4 is not limited to such a position and the inversion path T4 may be provided to branch off from the discharge path T3.

However, when a configuration in which a portion of the feeding path T1 is used for the inversion path T4 as in the present embodiment is adopted, an increase in apparatus size can be suppressed in comparison with a configuration in which the inversion path T4 dedicated for inversion is formed.

A switching flap 42, which is an example of a switching portion, is provided between the transportation roller pair 20 and the inversion roller 15. When the medium is to be fed to the inversion path T4 and when the feeding path T1 is to be coupled to the recording path T2, the switching flap 42 is caused to enter a second state as represented by a solid line in FIG. 2.

When a medium after recording performed thereon (more specifically, a medium with a nozzle check pattern recorded thereon which will be described later) is to be fed to the reading path T5, the switching flap 42 is controlled by the controller 90 to enter a first state as represented by a two-dot chain line and a reference numeral "42-1" in FIG. 2.

As described above, the switching flap 42 is a portion that switches feeding directions of a medium after recording performed thereon and that switches between the first state in which a feeding direction is set to a direction toward the reading path T5 and the second state in which a feeding direction is set to a direction other than the direction toward the reading path T5 (in the present example, a direction toward the inversion path T4).

The reading path T5 is provided with the reading unit 50, which is an example of a reader. The reading unit 50 includes a sensor module 51 which is an example of a reading sensor, and the sensor module 51 is a contact image sensor module (CISM), for example. The reading unit 50 reads a surface of a medium transported along the reading path T5. The pressing portion 72 that presses the medium toward the reading unit 50 is provided at a position facing the reading unit 50.

The pressing portion 72 is pressed toward the reading unit 50 by a pressing spring 73, which is an example of a pressing member. Accordingly, the medium can be brought into close contact with the reading unit 50, and thus favorable reading accuracy can be achieved.

Figure 9:
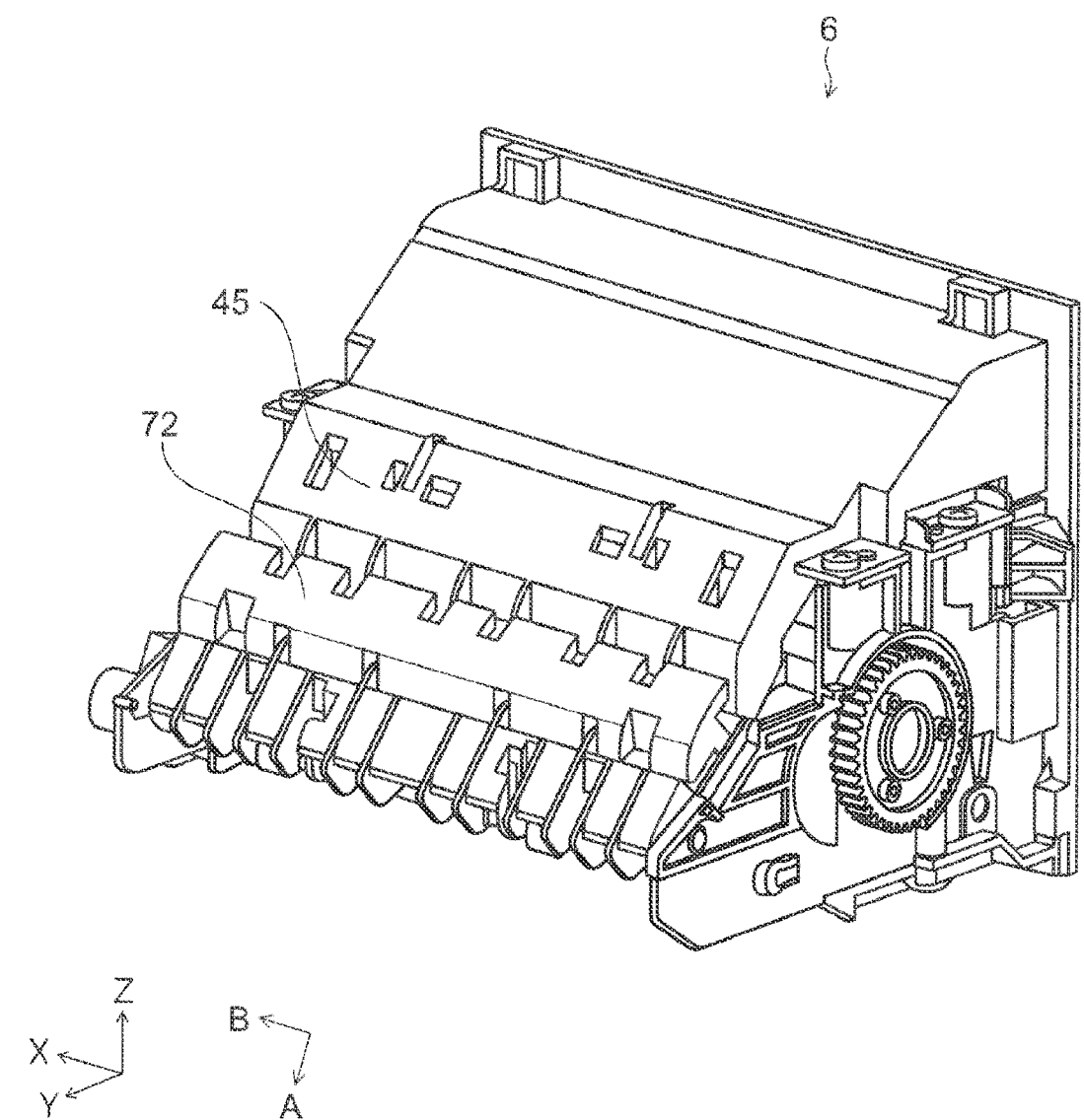
FIG. 9 is a perspective view of an inversion unit.

A lower side of the reading path T5 is formed by an inclined guide member 45, and the pressing portion 72 and the pressing spring 73 are provided at the inclined guide member 45. The inclined guide member 45 constitutes the inversion unit 6 as shown in FIG. 9. The reading path T5 is formed above the inclined guide member 45, and a path portion of the feeding path T1 that extends downstream from an uppermost portion of the inversion roller 15 forms a shape downwardly inclined along the inclined guide member 45.

Figure 21:
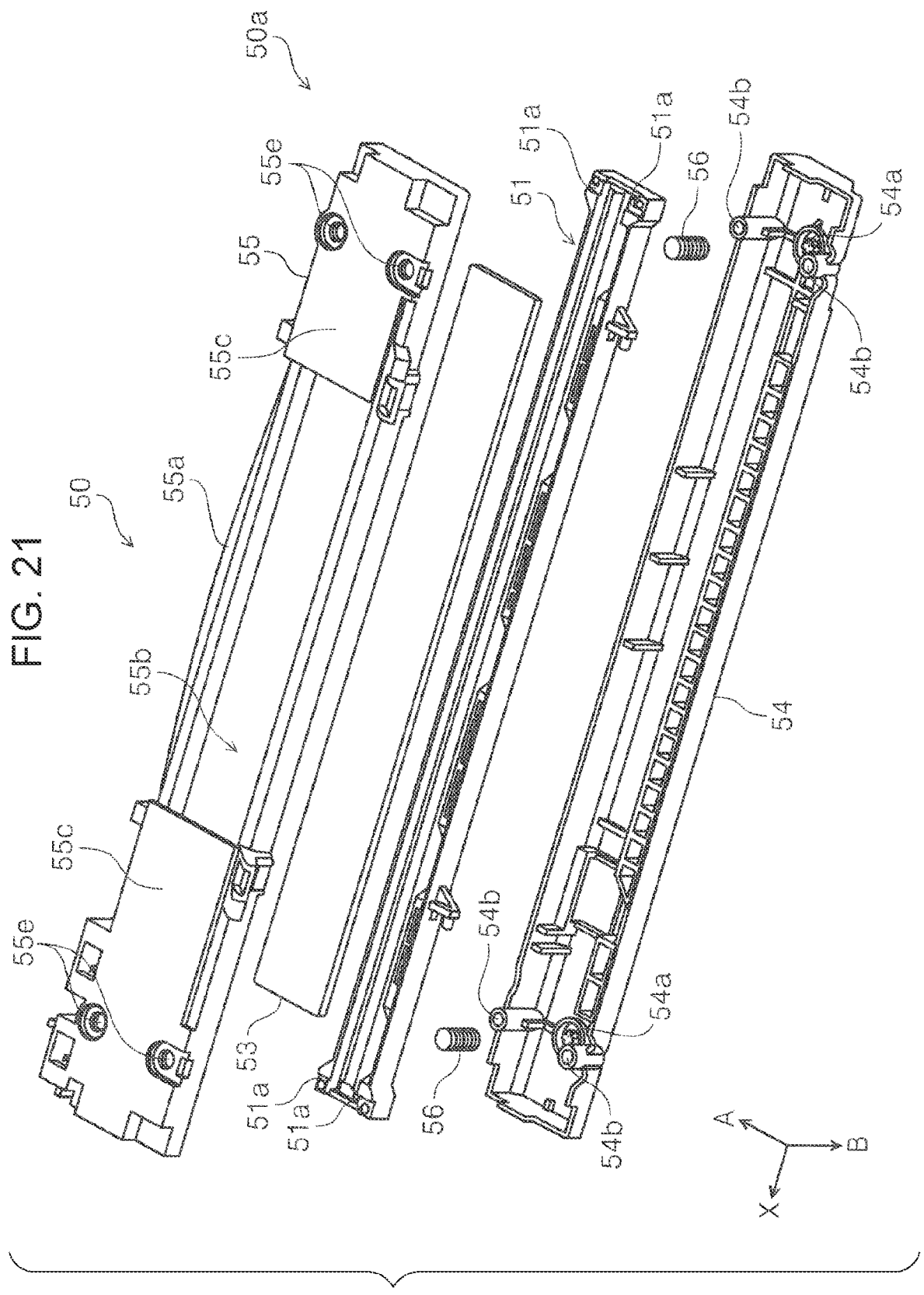
FIG. 21 is an exploded perspective view of the reading unit.

As shown in FIG. 21, the reading unit 50 includes a housing structure 50a, and the sensor module 51 is held by the housing structure 50a. The sensor module 51 and the housing structure 50a constitute the reading unit 50.

At a second housing member 55 constituting the housing structure 50a, a guide portion 55a that guides a medium to a space between the reading unit 50 and the pressing portion 72 when the transportation roller pair 20 rotates backward and the medium is fed to the reading path T5 is formed. Accordingly, it is possible to guide the medium to the space between the reading unit 50 and the pressing portion 72 without a dedicated guide member, and thus it is possible to suppress an increase in cost.

Figure 14:
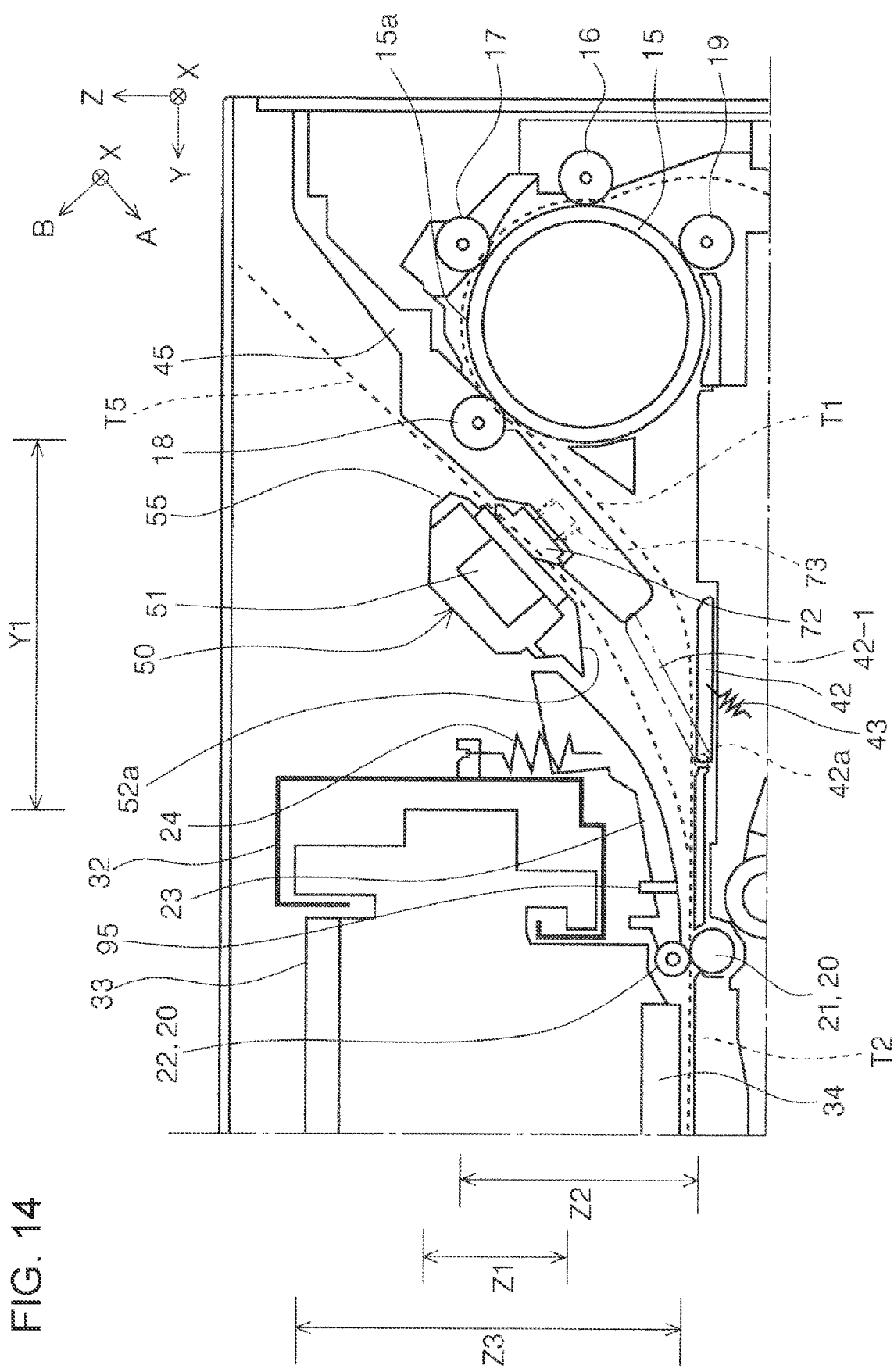
FIG. 14 is a view showing a portion of the medium transportation path.

Here, disposition of the reading unit 50 will be described in detail with reference to FIG. 14. An uppermost portion 15a of the inversion roller 15 is above the recording path T2. The feeding path T1 has a shape downwardly inclined downstream (in the +Y direction) from the uppermost portion 15a of the inversion roller 15, and the reading path T5 includes a path portion that is positioned above the feeding path T1 and that extends along the path portion of the feeding path T1 having the shape downwardly inclined. The reading unit 50 is positioned in a region Y1 between the carriage 33 and the inversion roller 15 in the Y-axis direction (that is, in the apparatus depth direction). In addition, a portion of the carriage 33 and a portion of the inversion roller 15 are positioned in the height range of the reading unit 50 in the Z-axis direction (that is, the apparatus height direction). A range represented by a reference numeral "Z1" is the height range of the reading unit 50, a range represented by a reference numeral "Z2" is the height range of the inversion roller 15, and a range represented by a reference numeral "Z3" is the height range of the carriage 33.

As shown in the drawing, a portion of the height range Z3 of the carriage 33 and a portion of the height range Z2 of the inversion roller 15 are positioned in the height range Z1 of the reading unit 50.

With such a configuration, the reading unit 50 is disposed with effective utilization of a space between the carriage 33 and the inversion roller 15, and thus a decrease in apparatus size can be achieved.

The reading unit 50 may also be disposed such that the height range Z1 of the reading unit 50 falls in the height range Z2 of the inversion roller 15.

Next, a configuration of switching between the states of the switching flap 42 will be described.

Figure 5:
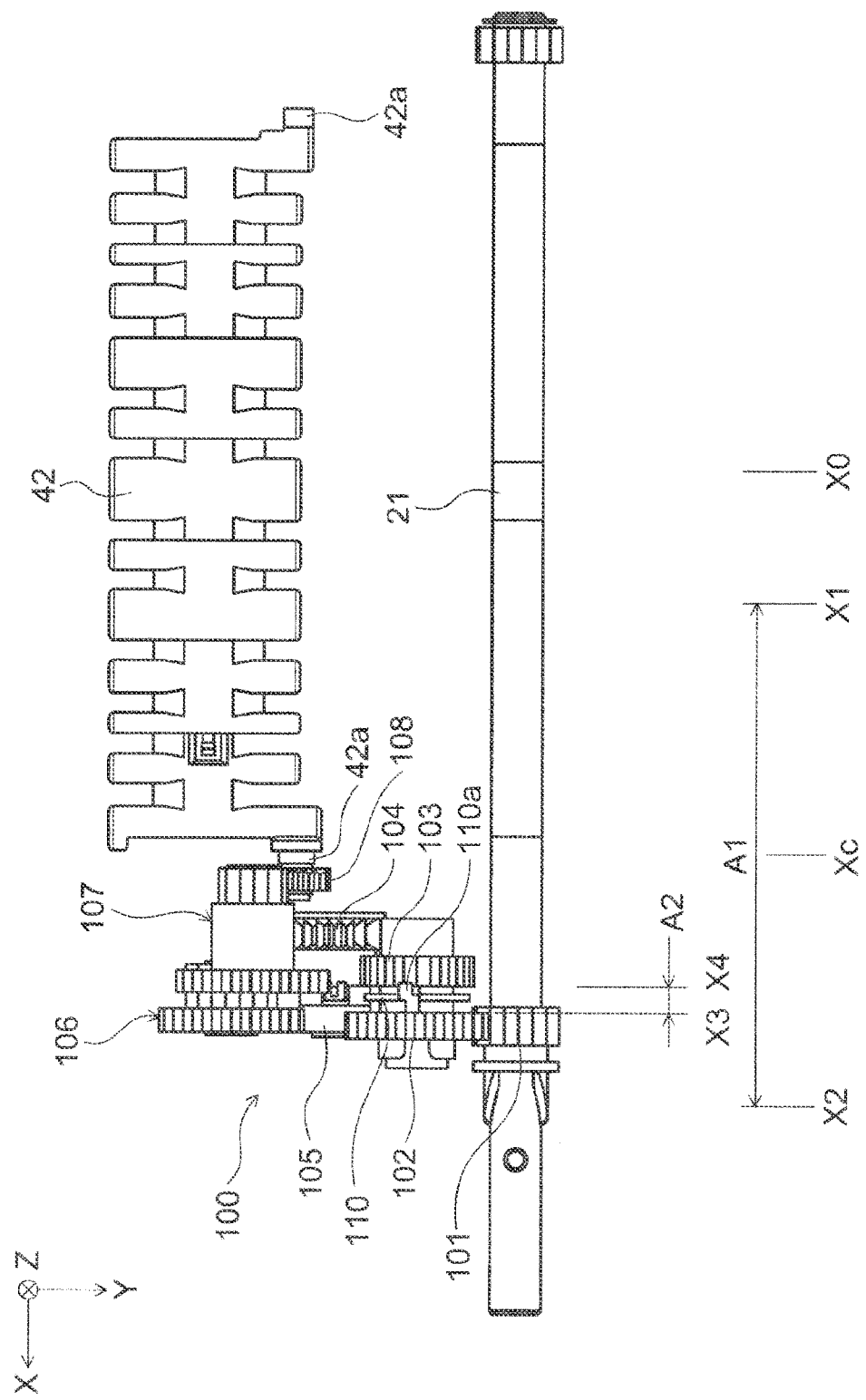
FIG. 5 is a plan view of the power transmitter.
Figure 6:
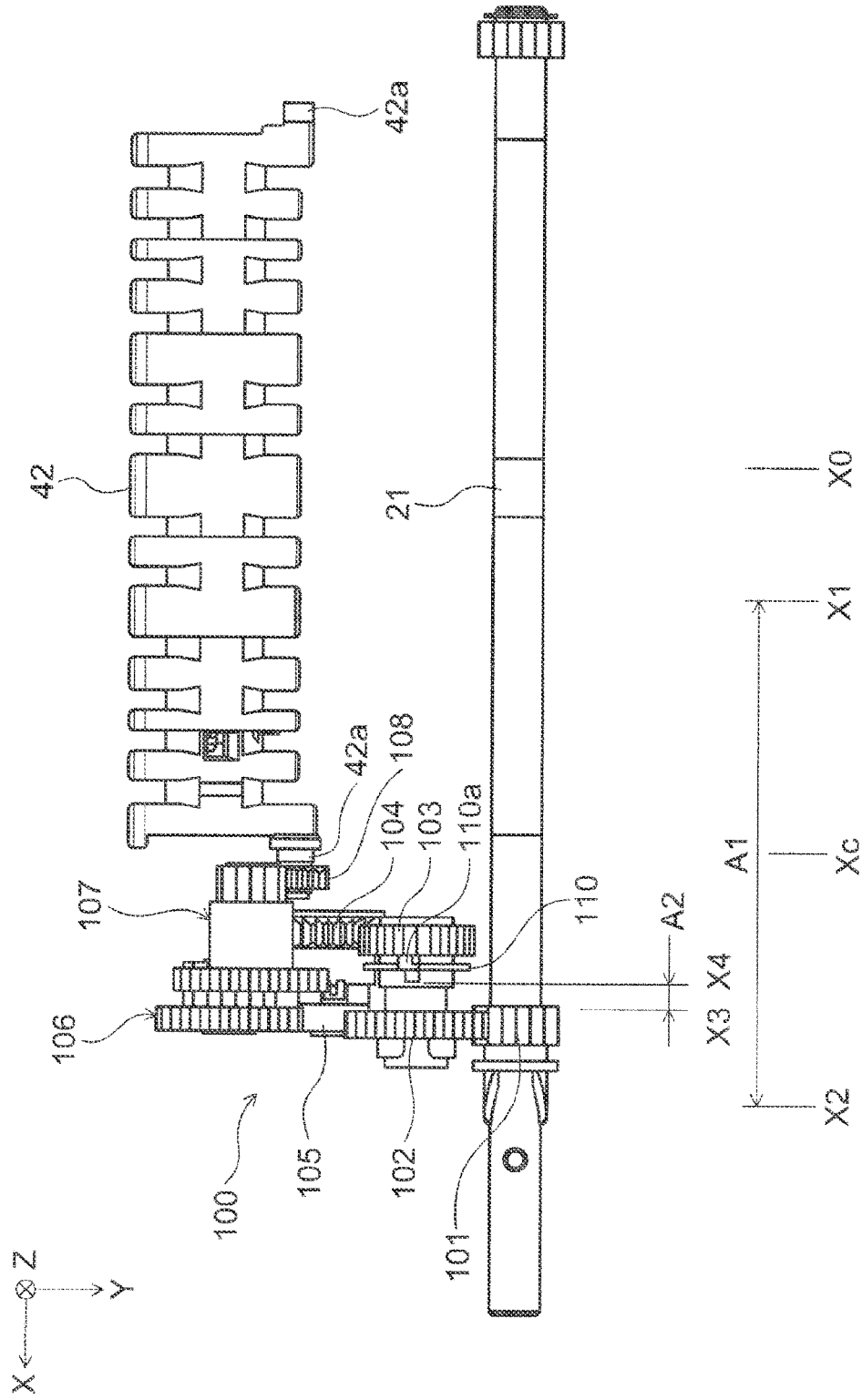
FIG. 6 is a plan view of the power transmitter.
Figure 8:
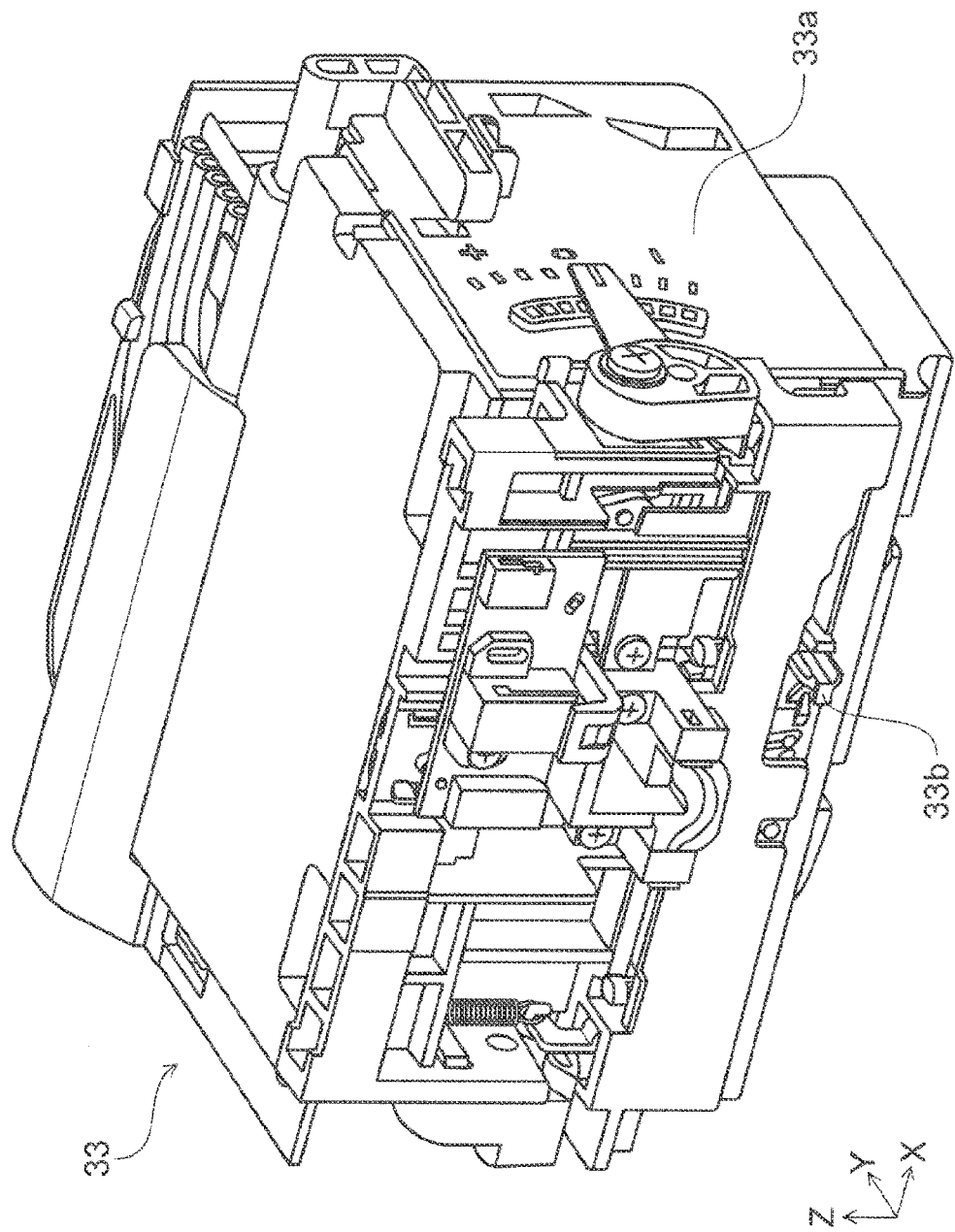
FIG. 8 is a perspective view showing a carriage as seen from a rear side.

Regarding the carriage 33, an end portion of a movable range in the −X direction is a home position. In FIGS. 5 and 6, positions X0, X1, X2, and Xc are positions at which a side wall 33a (refer to FIG. 8) of the carriage 33 in the +X direction can be positioned. Hereinafter, for the sake of convenience, the positions X0, X1, X2, and Xc will be described as the positions of the carriage 33.

The position X0 is the home position of the carriage 33. In addition, the position X1 is a position at which the carriage 33 is positioned when being moved furthest in the −X direction within a recording-enabled range A1 and the position X2 is a position at which the carriage 33 is positioned when being moved furthest in the +X direction within the recording-enabled range A1. The position Xc is the central position in the recording-enabled range A1.

The home position X0 of the carriage 33 is set to be closer to one side, to which the −X direction extends, than the central position Xc is.

In addition, a contact lever 110a, which is an example of a contact member, is provided to be closer to the other side, to which the +X direction extends, than the central position Xc is. The shape of the contact lever 110a is shown in more detail in FIG. 4 and FIGS. 7A and 7B. The contact lever 110a constitutes a power transmitter 100, and the power transmitter 100 is disposed to be closer to the side to which the +X direction extends than the central position Xc is.

The power transmitter 100 is configured to be able to switch between a power transmission state in which power of the transportation driving roller 21 is transmitted to the switching flap 42 and a non-power transmission state in which the power of the transportation driving roller 21 is not transmitted to the switching flap 42. Such a switch is performed by means of the carriage 33.

Figure 4:
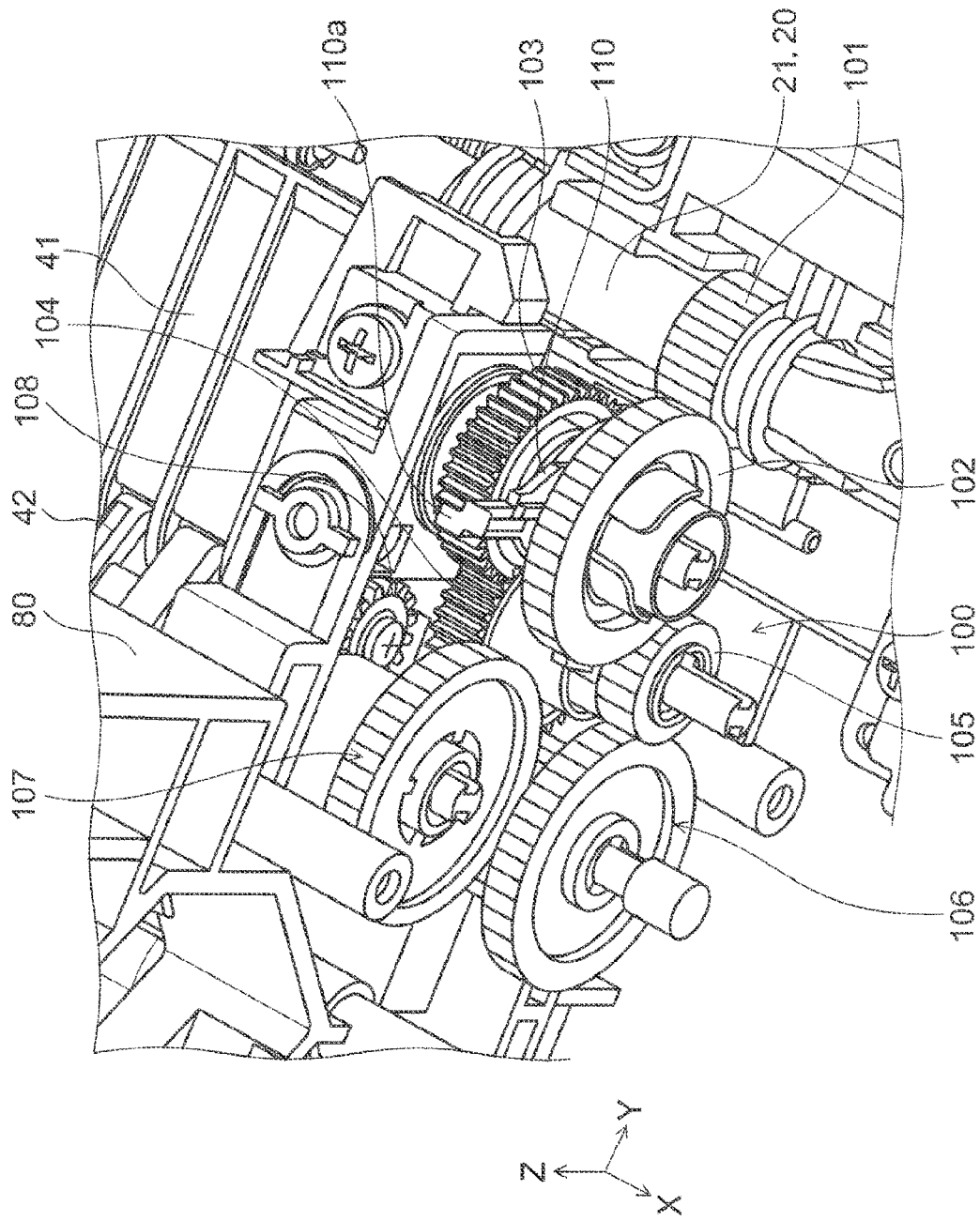
FIG. 4 is a perspective view of a power transmitter.

As shown in FIG. 4, the power transmitter 100 includes gears 101, 102, 103, 104, 105, 106, 107, and 108, a rotary member 110, the contact lever 110a, and a pressing spring 111 (refer to FIGS. 7A and 7B) which is an example of a pressing member.

When the power transmitter 100 enters the power transmission state, power is transmitted, from the gear 101 provided on the transportation driving roller 21, to the gears 102, 103, 104, 105, 106, 107, and 108 in this order. As shown in FIGS. 5 and 6, the gear 108 is a gear provided on a rotary shaft 42a of the switching flap 42 in the +X direction.

The gears 106 and 107 are two-stage gears. In addition, the gear 102 and the gear 103 are provided to rotate coaxially and integrally. In addition, the gear 104 and the gear 105 are also provided to rotate coaxially. However, although not described in detail, the gear 104 and the gear 105 are configured such that a rotational torque is transmitted between the gear 104 and the gear 105 via a frictional force and thus the gears 104, 103, and 102 can continue to rotate in a state where the gears 108, 107, 106, and 105 are stopped.

Figure 15:
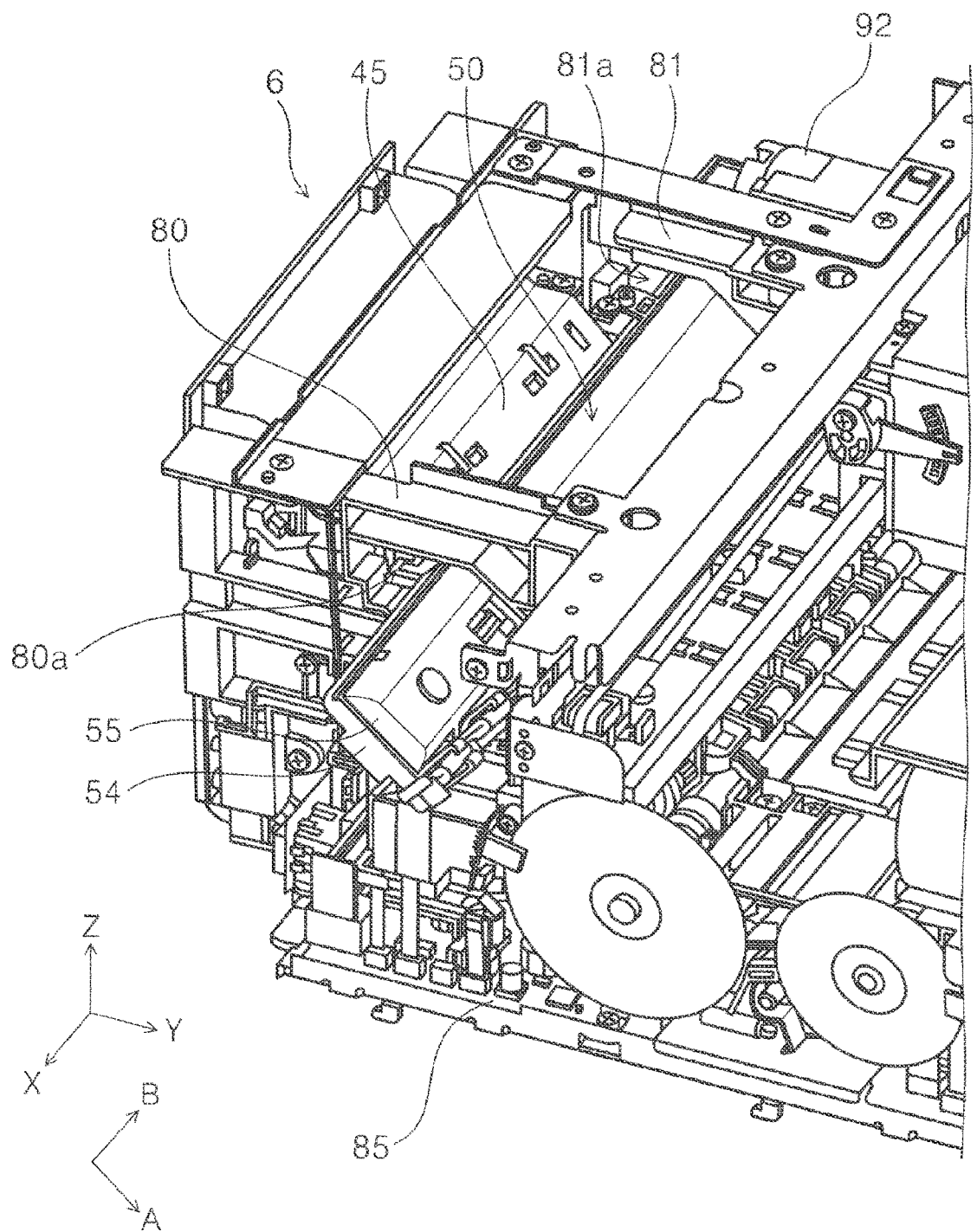
FIG. 15 is a perspective view of an apparatus rear portion from which a housing is removed, and is a view showing a state where a reading unit is attached.
Figure 16:
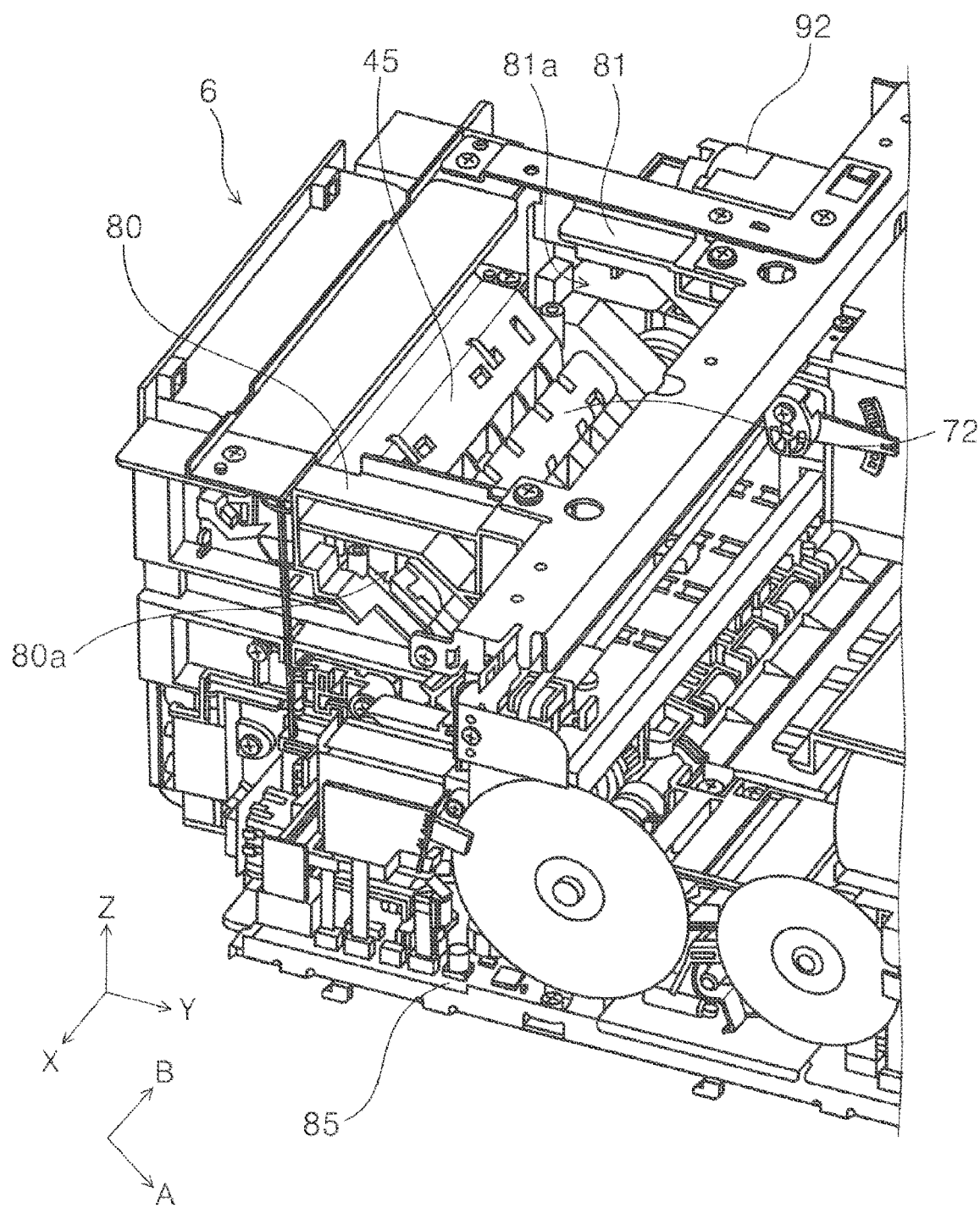
FIG. 16 is a perspective view of the apparatus rear portion from which the housing is removed, and is a view showing a state where the reading unit is removed.

Regarding the switching flap 42, the rotary shaft 42a in the +X direction is rotatably supported by a left frame 80 (refer to FIG. 15 and FIG. 16) and the rotary shaft 42a in the −X direction is rotatably supported by a right frame 81 (refer to FIG. 15 and FIG. 16). The center of a rotary shaft of the switching flap 42 is parallel to the X-axis direction, that is, intersects the medium transportation direction.

The limit of rotation of the switching flap 42 at the time of backward rotation of the transportation motor 91 and the limit of rotation of the switching flap 42 at the time of forward rotation of the transportation motor 91 are defined with the switching flap 42 coming into contact with a rotation restriction portion (not shown).

Note that the switching flap 42 is pressed, by a tension spring 43 (refer to FIGS. 10 and 11), in a downward direction, that is, in a direction to enter the second state.

The gear 103 is displaceable in the X-axis direction, and by being displaced in the X-axis direction, the gear 103 switches between a state in which the gear 103 meshes with the gear 104 (refer to FIG. 6) and a state in which the gear 103 does not mesh with the gear 104 (refer to FIG. 5). The power transmitter 100 enters the power transmission state when the gear 103 meshes with the gear 104 and the power transmitter 100 enters the non-power transmission state when the gear 103 does not mesh with the gear 104.

When the transportation driving roller 21 rotates backward in a state where the power transmitter 100 is in the power transmission state and the switching flap 42 is in the second state in which a medium feeding direction is set to the direction toward the inversion path T4, the switching flap 42 switches from the second state to the first state (that is, a state in which the medium feeding direction is set to the direction toward the reading path T5).

In addition, when a switch to the non-power transmission state of the power transmitter 100 is performed in a state where the power transmitter 100 is in the power transmission state and the switching flap 42 is in the first state in which the medium feeding direction is set to the direction toward the reading path T5, the switching flap 42 switches from the first state to the second state (that is, a state in which the medium feeding direction is set to the direction toward the inversion path T4) because of the weight of the switching flap 42 and a spring force of the tension spring 43.

Note that, the switch from the first state to the second state of the switching flap 42 may be performed by means of forward rotation of the transportation driving roller 21. In addition, the switch from the first state to the second state may be performed by means of only the weight of the switching flap 42.

As shown in FIGS. 7A and 7B, the gear 103 is pressed in the +X direction by the pressing spring 111. In addition, the pressing spring 111 presses the rotary member 110 in the +X direction via the gear 103.

The contact lever 110a is integrally formed with the rotary member 110. The rotary member 110 is rotatable via friction between the rotary member 110 and the gear 102, and when the transportation driving roller 21 rotates forward in a state where the power transmitter 100 is in the power transmission state, the rotary member 110 comes into contact with a lever contact portion 112 shown in FIG. 7A and maintains such a state. In such a state, the contact lever 110a is out of the movement region of the carriage 33 and is at a position where the contact lever 110a cannot come into contact with an engagement portion 33b (refer to FIG. 8) provided on a rear surface of the carriage 33.

An opening portion 32b is formed at a lower frame portion 32a of the main frame 32. In addition, when the transportation driving roller 21 rotates backward in a state where the power transmitter 100 is in the power transmission state, the contact lever 110a enters the opening portion 32b as shown in FIG. 7B and comes into contact with a contact surface 32c of the opening portion 32b. In such a state, the contact lever 110a is within the movement region of the carriage 33 and is at a position where the contact lever 110a can come into contact with the engagement portion 33b (refer to FIG. 8) provided on the rear surface of the carriage 33. The position of the contact lever 110a in the X-axis direction in this state will be referred to as a first position X3 (refer to FIG. 5). When the contact lever 110a is at the first position X3, the gear 103 and the gear 104 do not mesh with each other.

When the carriage 33 moves to a side to which the −X direction extends from a side to which the +X direction extends in FIG. 7B in such a state, the engagement portion 33b provided on the rear surface of the carriage 33 presses the contact lever 110a in the −X direction. Accordingly, the rotary member 110 integrally formed with the contact lever 110a moves the gear 103 in the −X direction and thus the gear 103 meshes with the gear 104. That is, the power transmitter 100 enters the power transmission state. The position of the contact lever 110a in the X-axis direction in such a state will be referred to as a second position X4 (refer to FIG. 6).

Next, the feeding of a medium to the reading path T5 will be described. Note that, each control described below is realized by a program (not shown) stored in a non-volatile memory (not shown) included in the controller 90 (refer to FIG. 3).

The controller 90 executes a nozzle check mode at a predetermined time. The nozzle check mode is a mode in which a nozzle check pattern CP (refer to FIG. 13) used to check the state of ink ejection of the recording head 34 is recorded on a medium Pt, the medium Pt with the nozzle check pattern CP recorded thereon is fed to the reading path T5 so that the nozzle check pattern CP is read by the reading unit 50, and it is determined, based on the result of a reading operation, whether or not an ink ejection nozzle (not shown) is clogged. When it is determined that the ink ejection nozzle is clogged, the controller 90 causes a display (not shown) of the operation portion 3 (refer to FIG. 1A) or a display (not shown) of a computer coupled to the printer 1 to display an error and executes automatic cleaning of the recording head 34 in a case where automatic cleaning is enabled. This automatic cleaning is an operation of covering the recording head 34 with a cap (not shown) and generating a negative pressure in the cap so that ink is sucked from the ink ejection nozzle.

In the present example, the nozzle check mode can be executed by the user at any time via the operation portion 3 (refer to FIG. 1A).

In addition, in the present example, whether to perform automatic execution of the nozzle check mode can be selected via the operation portion 3 (refer to FIG. 1A). In addition, in the present example, the automatic execution of the nozzle check mode includes a first automatic mode and a second automatic mode.

When the first automatic mode is selected and a prerecording check is enabled, the controller 90 executes the nozzle check mode before the start of recording when a recording execution command is received. In addition, when the first automatic mode is selected, the controller 90 stops a recording job and executes the nozzle check mode even while the recording job is being executed in a case where the number of times of recording after the last execution of the nozzle check mode reaches the number of times of recording set in advance.

When the second automatic mode is selected, the controller 90 turns on a nozzle check mode execution flag in a case where the number of times of recording after the last execution of the nozzle check mode reaches the number of times of recording set in advance. In addition, when the execution flag is ON before the start of the next recording, the nozzle check mode is executed. Note that, in the second automatic mode, a recording job is not stopped and the nozzle check mode is not executed even when the number of times of recording after the last execution of the nozzle check mode reaches, during execution of the recording job, the number of times of recording set in advance.

Next, control of the controller 90 at the time of execution of the nozzle check mode will be described in more detail with reference to FIG. 12.

When the controller 90 determines that a time for execution of the nozzle check mode has been reached, the controller 90 executes recording of the nozzle check pattern CP (step S101). Note that, after the recording of the nozzle check pattern CP is finished, a trailing end of a medium is positioned between the transportation roller pair 20 and the medium detector 95.

Next, the controller 90 causes the carriage 33 to move to an end portion in the +X direction (step S102) and then causes the transportation motor 91 to rotate backward by a first defined amount (step S103). Accordingly, as shown with a change from a state shown in FIG. 7A to a state shown in FIG. 7B, the contact lever 110a advances into the movement region of the carriage 33. At this time, the contact lever 110a is at the first position X3 (refer to FIG. 5). Note that, because of execution of step S103, the medium Pt moves slightly in the −Y direction, and thus, as shown in FIG. 10, a trailing end Pe of the medium Pt is positioned closer to a side to which the −Y direction extends than the medium detector 95 is. In this state, the switching flap 42 is in the second state.

Next, the controller 90 causes the carriage 33 to move in the −X direction (step S104), so that the contact lever 110a moves from the first position X3 to the second position X4 (refer to FIG. 6) and the power transmitter 100 switches to the power transmission state.

In this state, the controller 90 causes the transportation motor 91 to rotate forward by the first defined amount (that is, causes the transportation roller pair 20 to rotate forward) (step S105). Accordingly, the medium Pt moved in the −Y direction because of execution of step S103 is returned to the original position. Because of such processing, the trailing end of the medium Pt is disposed between the transportation roller pair 20 and the medium detector 95 again.

Note that, at this time, the contact lever 110a moves to be out of the movement region of the carriage 33 because of the forward rotation of the transportation motor 91. However, in this state, the contact lever 110a is in a restriction hole 32d formed at the lower frame portion 32a (refer to FIGS. 7A and 7B) of the main frame 32 and thus a state where the carriage 33 is in the movement region is maintained. That is, the power transmission state of the power transmitter 100 is maintained.

Figure 11:
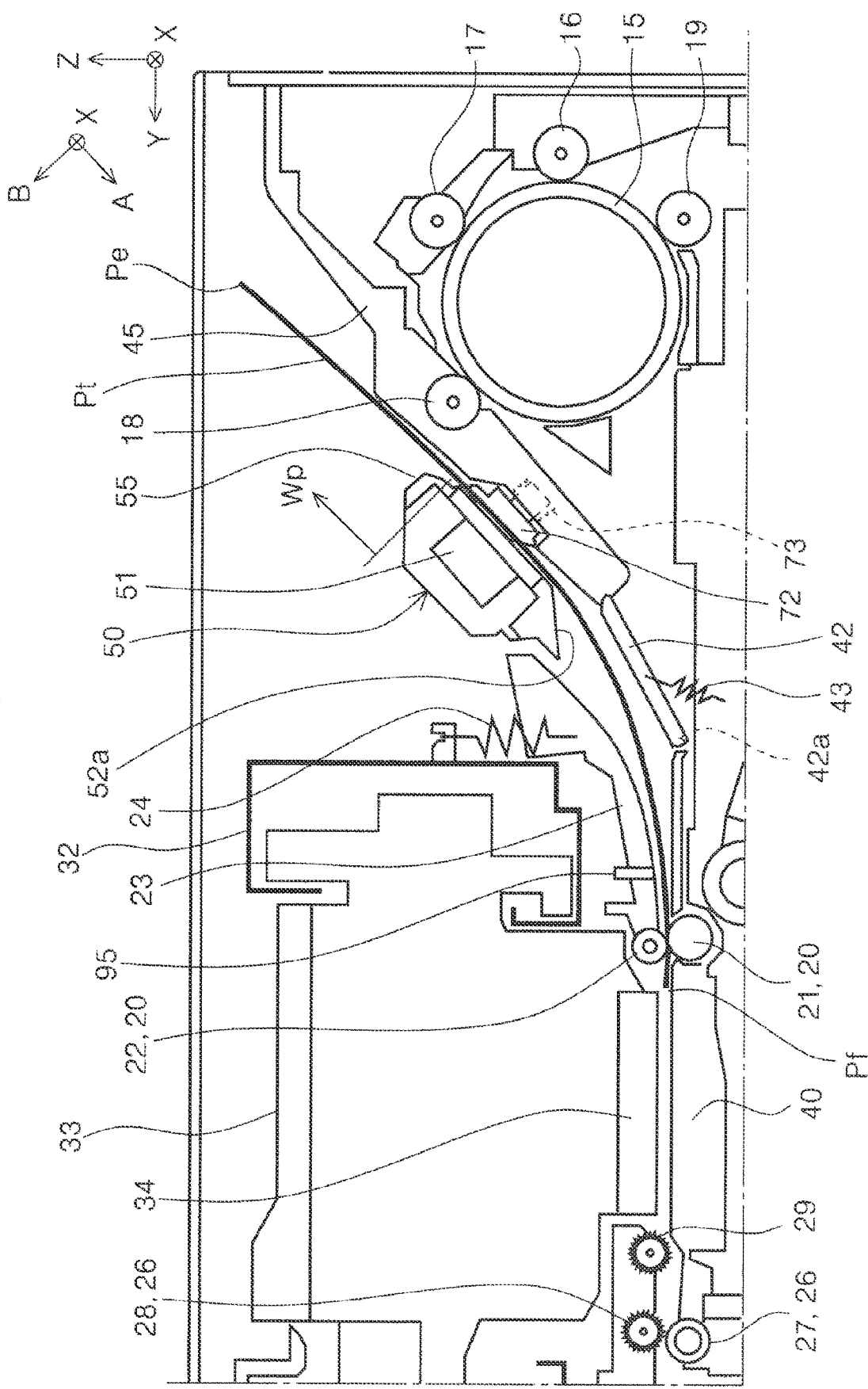
FIG. 11 is a view showing a portion of the medium transportation path with the switching flap being in a second state.

Next, the controller 90 causes the transportation motor 91 to rotate backward (that is, causes the transportation roller pair 20 to rotate backward) (step S106). In an initial stage of the backward rotation of the transportation motor 91, the switching flap 42 switches to the first state as shown in FIG. 11. The backward rotation of the transportation motor 91 is continued until the medium Pt slightly passes through a reading standby position, which is shown in FIG. 11, in a −A direction after the medium detector 95 detects the trailing end Pe of the medium Pt.

It is possible to accurately transport the medium Pt by a necessary transportation amount by transporting the medium Pt in the −A direction after the trailing end Pe of the medium Pt is disposed between the transportation roller pair 20 and the medium detector 95 as described above.

Next, the controller 90 causes the carriage 33 to move to the end portion in the +X direction (step S107). Accordingly, the contact lever 110a moves from the second position X4 (refer to FIG. 6) to the first position X3 (refer to FIG. 5), and the power transmitter 100 switches to the non-power transmission state. In this state, since the contact lever 110a is in the movement region of the carriage 33, the controller 90 causes the transportation motor 91 to rotate forward by the first defined amount (step S108). Accordingly, the contact lever 110a is withdrawn from the movement region of the carriage 33 as shown with a change from the state shown in FIG. 7B to the state shown in FIG. 7A.

Then, the controller 90 causes the carriage 33 to move to the home position in the −X direction (step S109). Accordingly, the recording head 34 is covered with the cap (not shown).

The medium Pt is positioned at the reading standby position shown in FIG. 11 because of the forward rotation of the transportation motor 91 in step S108. In this state, the nozzle check pattern CP (refer to FIG. 13) is positioned closer to a side to which a direction along an arrow extends than a position Wp shown in FIG. 11 is. The position Wp is the position farthest from the transportation roller pair 20 within a range where the reading unit 50 can read.

In other words, the nozzle check pattern CP of the medium Pt fed to the reading path T5 by means of backward rotation of the transportation roller pair 20 is at a position far from the transportation roller pair 20 with respect to the reading unit 50.

Figure 13:
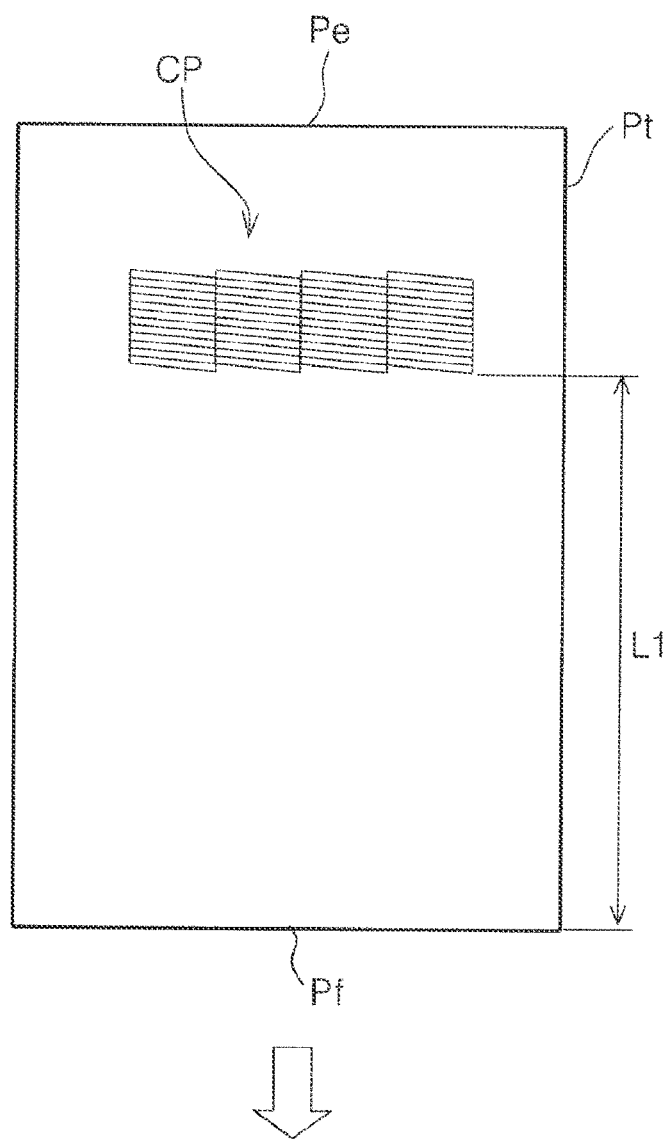
FIG. 13 is a view showing a medium with a nozzle check pattern recorded thereon.

In FIG. 13, a distance L1 from a leading end Pf of the medium Pt to the nozzle check pattern CP is larger than the length of a path between a nip position of the transportation roller pair 20 and the position Wp.

Next, the controller 90 reads the nozzle check pattern CP by means of the reading unit 50 while causing the transportation motor 91 (that is, the transportation roller pair 20) to rotate forward (step S110). When the reading of the nozzle check pattern CP is finished, the controller 90 causes the transportation motor 91 (that is, the transportation roller pair 20) to rotate forward so that the medium Pt is discharged (step S111).

As described above, the printer 1 includes the recording path T2, the feeding path T1 coupled to the recording path T2, and the discharge path T3 coupled to the recording path T2. In addition, the reading path T5, which is a transportation path for the medium Pt provided independent of the recording path T2, the feeding path T1, and the discharge path T3 and to which the medium Pt with the nozzle check pattern CP recorded thereon is fed, and the switching flap 42 that switches between the first state in which a feeding direction of the medium Pt after recording performed thereon is set to the direction toward the reading path T5 and the second state in which the feeding direction is set to a direction other than the direction toward the reading path T5 are provided.

Accordingly, a medium after normal recording performed thereon passes through the discharge path T3 and the medium Pt with the nozzle check pattern CP recorded thereon passes through the reading path T5. Therefore, the reading unit 50 is less likely to be stained and the state of ejection of ink from the recording head 34 can be appropriately checked.

In addition, in the reading path T5, there is a transportation load since a medium is nipped by the reading unit 50 and the pressing portion 72. Since no medium after normal recording performed thereon passes through the reading path T5, no transportation load is applied to a medium after normal recording performed thereon by the reading unit 50 and the pressing portion 72.

Note that, in the present example, a recorded image used to check the state of ejection of ink from the recording head 34 is the nozzle check pattern CP. However, the recorded image is not limited thereto and the recorded image can be any image as long as the state of ejection of ink (that is, recording quality) can be checked.

In addition, a method of reading the nozzle check pattern CP, which is executed by the controller 90 of the printer 1, includes a step of recording the nozzle check pattern CP by means of the recording head 34, a step (step S104 in FIG. 12) of transporting the medium Pt such that the nozzle check pattern CP is disposed at a position far from the recording head 34 with respect to the reading unit 50, and a step (step S105 in FIG. 12) of reading the nozzle check pattern CP by means of the reading unit 50 while transporting the medium Pt such that the nozzle check pattern CP faces the recording head 34.

The nozzle check pattern CP may be read in the step of transporting the medium Pt such that the nozzle check pattern CP is disposed at the position far from the recording head 34 with respect to the reading unit 50.

In addition, the transportation roller pair 20 that rotates forward to transport the medium Pt to a position facing the recording head 34 at the time of recording performed by the recording head 34 is provided in the recording path T2 and the reading path T5 is provided at a position to which the medium Pt is fed when the transportation roller pair 20 rotates backward. The nozzle check pattern CP of the medium Pt fed to the reading path T5 because of backward rotation of the transportation roller pair 20 is at a position far from the transportation roller pair 20 with respect to the reading unit 50 and is read by the reading unit 50 at the time of forward rotation of the transportation roller pair 20.

Accordingly, the medium Pt is transported while being pulled at the position of the reading unit 50. Therefore, the accuracy of transportation of the medium Pt performed when the nozzle check pattern CP is read can be made favorable and the nozzle check pattern CP can be appropriately read.

Note that, the presence or absence of the nozzle check pattern CP may be checked by the reading unit 50 when the medium Pt is fed to the reading path T5 by means of backward rotation of the transportation roller pair 20 and in a case where no nozzle check pattern CP is found even when the transportation roller pair 20 is rotated backward by a predetermined amount, the medium Pt may be discharged with the transportation roller pair 20 rotated forward and the nozzle check mode may be retried on a presumption that there is an error.

In addition, when the medium Pt is read by the reading unit 50 at the time of forward rotation of the transportation roller pair 20, the transportation roller pair 20 is the only roller pair nipping the medium Pt. Accordingly, a transportation load acting on the transportation roller pair 20 when the nozzle check pattern CP is read is reduced, the accuracy of transportation of the medium Pt performed when the nozzle check pattern CP is read can be made favorable, and the nozzle check pattern CP can be appropriately read.

Note that, in the present example, the leading end Pf of the medium Pt is not nipped by the discharge roller pair 26 until the reading of the nozzle check pattern CP is finished.

However, a roller pair nipping the medium Pt when the medium Pt is read by the reading unit 50 at the time of forward rotation of the transportation roller pair 20 may include a roller other than the transportation roller pair 20.

In addition, in the present example, the leading end Pf of the medium Pt is not under the recording head 34 at the time of the start of the reading of the nozzle check pattern CP. However, when the leading end Pf of the medium Pt is under the recording head 34 at the time of the start of the reading of the nozzle check pattern CP, a variation in accuracy of transportation caused by the leading end Pf caught on the recording head 34 can be suppressed and the nozzle check pattern CP can be appropriately read.

In addition, regarding the reading path T5, a path portion upstream of the reading unit 50 at the time of forward rotation of the transportation roller pair 20 is linear as is clear from FIG. 11. In other words, the posture of the medium Pt upstream of the reading unit 50 is linear at the time of forward rotation of the transportation roller pair 20. Accordingly, a transportation load acting on the transportation roller pair 20 when the nozzle check pattern CP is read is reduced, the accuracy of transportation of the medium Pt performed when the nozzle check pattern CP is read can be made favorable, and the nozzle check pattern CP can be appropriately read.

In addition, the inversion roller 15 and the pressing portion 72 constitute the inversion unit 6, and the inversion unit 6 is detachable from the apparatus main body 2 including the recording head 34. That is, the inversion roller 15 and the pressing portion 72 are integrally detachable from the apparatus main body 2. As shown in FIG. 9, the pressing portion 72 is exposed to the outside of the inversion unit 6 when the inversion unit 6 is removed. Accordingly, a repairing operation performed when the inside of the apparatus main body 2 is clogged with a medium is easy and cleaning the reading unit 50 and the pressing portion 72 is also easy since the reading unit 50 and the pressing portion 72 are separated from each other.

However, the pressing portion 72 may not be provided in the inversion unit 6 but may be provided to be fixed to the apparatus main body 2.

In addition, the switching flap 42 switches between the first state and the second state by means of power obtained from the transportation driving roller 21, which is a roller constituting the transportation roller pair 20. As a result, a dedicated power source used to drive the switching flap 42 is not necessary, and thus it is possible to suppress an increase in cost, an increase in apparatus weight, and an increase in size.

However, the switching flap 42 may switch between the states by means of other power, or may be configured such that a switch between the states is manually performed by a user.

In addition, the printer 1 includes the power transmitter 100 that is able to switch between the power transmission state in which power from the transportation driving roller 21 is transmitted to the switching flap 42 and the non-power transmission state in which the power from the transportation driving roller 21 is not transmitted to the switching flap 42. The power transmitter 100 includes the contact lever 110a that is a member movable in the direction of movement of the carriage 33, that forms the non-power transmission state by being positioned at the first position X3, and that forms the power transmission state by being positioned at the second position X4 and the pressing spring 111 that presses the contact lever 110a from the second position X4 to the first position X3. In addition, the contact lever 110a moves from the first position X3 to the second position X4 by being pressed by the carriage 33.

According to such a configuration, a dedicated power source used to move the contact lever 110a is not necessary, and thus it is possible to suppress an increase in cost, an increase in apparatus weight, and an increase in size.

In addition, the first position X3 and the second position X4 are within the movement region of the carriage 33 at the time of recording performed on a medium by the recording head 34. Accordingly, it is possible to suppress expansion of the movement region of the carriage 33 accompanied by the setting of the first position X3 and the second position X4 and thus it is possible to suppress an increase in apparatus size.

However, the first position X3 and the second position X4 may be out of the movement region of the carriage 33 at the time of recording performed on a medium by the recording head 34.

In addition, the home position X0, which is the position of the carriage 33 and is a position where the recording head 34 is capped, is set on one side with respect to the central position Xc and the first position X3 and the second position X4 are disposed on the other side with respect to the central position Xc, the central position Xc being the central position in a movement region A1 of the carriage 33 at the time of recording performed on a medium by the recording head 34. In the vicinity of the home position X0 of the carriage 33, movement of the carriage 33 may occur because of maintenance of the recording head 34. However, since the home position X0 is set on the one side with respect to the central position Xc and the first position X3 and the second position X4 are disposed on the other side, it is possible to prevent the contact lever 110a from interfering with the maintenance of the recording head 34.

However, the first position X3 and the second position X4 may be on the same side as the home position X0 with respect to the central position Xc.

Figure 12:
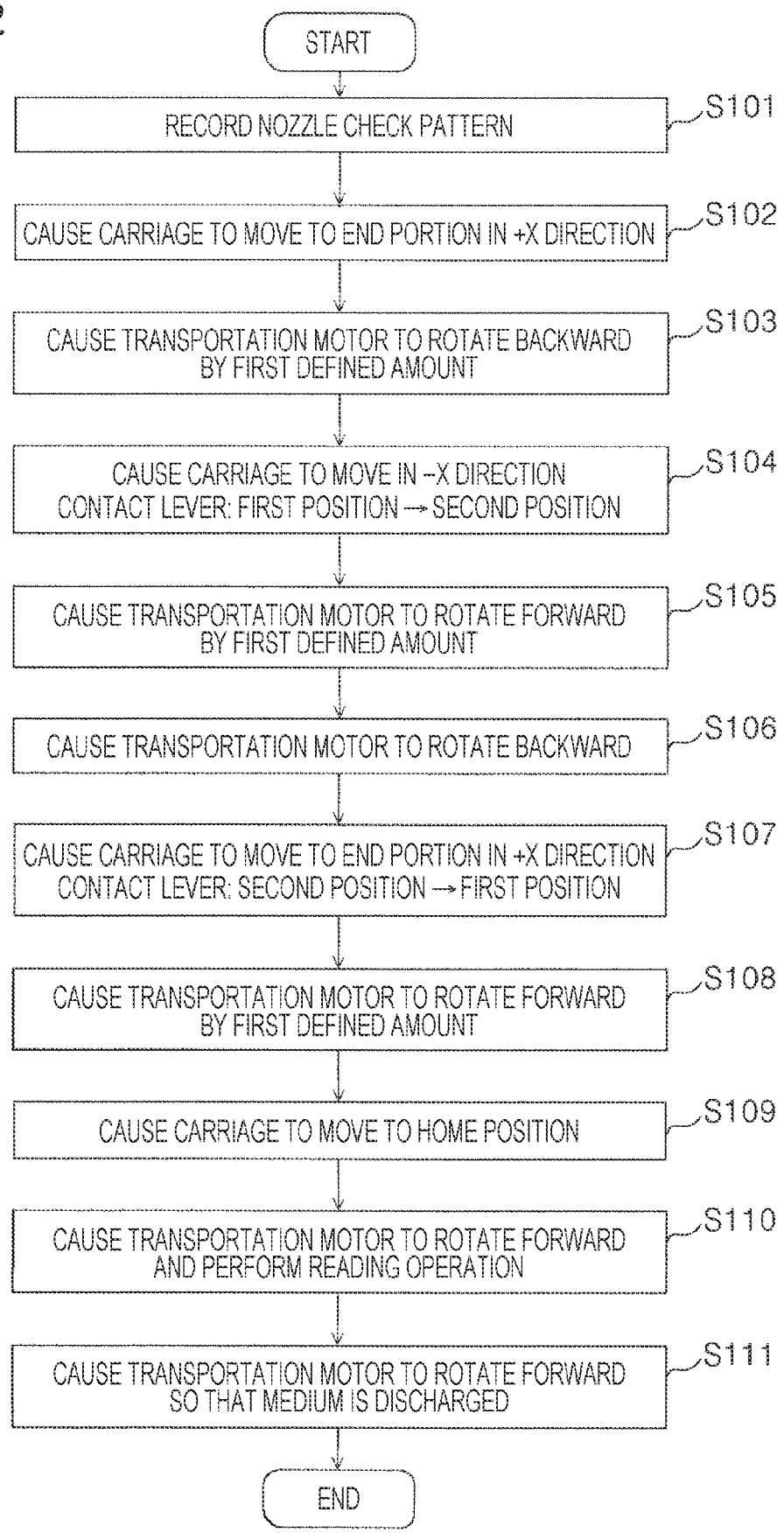
FIG. 12 is a flowchart showing the flow of control performed by a controller.

In addition, the first position X3, the second position X4, and the home position X0 are different positions from each other and after the medium Pt with the nozzle check pattern CP recorded thereon is fed to the reading path T5, the carriage 33 is moved to the home position X0 before the nozzle check pattern CP starts to be read (step S109 in FIG. 12). Accordingly, the recording head 34 is covered with the cap (not shown).

Accordingly, the ink ejection nozzle (not shown) of the recording head 34 is made less likely to be dried and thus appropriate recording quality can be maintained.

In addition, the contact lever 110a receives power from the transportation driving roller 21, is withdrawn from a position, at which the contact lever 110a can come into contact with the carriage 33, as the transportation driving roller 21 rotates forward, and advances to the position, at which the contact lever 110a comes into contact with the carriage 33, as the transportation driving roller 21 rotates backward. According to such a configuration, a dedicated power source used to drive the contact lever 110a is not necessary, and thus it is possible to suppress an increase in cost, an increase in apparatus weight, and an increase in size.

Next, the configuration and the attachment structure of the reading unit 50 will be described.

As shown in FIGS. 15 and 16, a base of an apparatus rear portion is composed of the left frame 80 and the right frame 81 that are disposed at an interval in the X-axis direction. The left frame 80 is an example of a first frame, the right frame 81 is an example of a second frame, and the left frame 80 and the right frame 81 form a pair of frames. The inversion unit 6 described above enters a mounted state by being inserted into a space between the left frame 80 and the right frame 81. Both the left frame 80 and the right frame 81 are formed of a resin material in the present example.

A left opening portion 80a is formed in the left frame 80, a right opening portion 81a is formed in the right frame 81, and the reading unit 50 penetrates the left opening portion 80a and the right opening portion 81a to be fixed. That is, the reading unit 50 is detachable from the left frame 80 and the right frame 81, and is supported by the left opening portion 80a and the right opening portion 81a in the mounted state.

When the reading unit 50 is to be mounted, in the present example, the reading unit 50 is inserted into the left opening portion 80a of the left frame 80 from a side to which the +X direction extends and the reading unit 50 is moved toward the right opening portion 81a. However, the present disclosure is not limited thereto, and a configuration may also be adopted in which the reading unit 50 is inserted into the right opening portion 81a from a side to which the −X direction extends and the reading unit 50 is moved toward the left opening portion 80a.

Figure 17A:
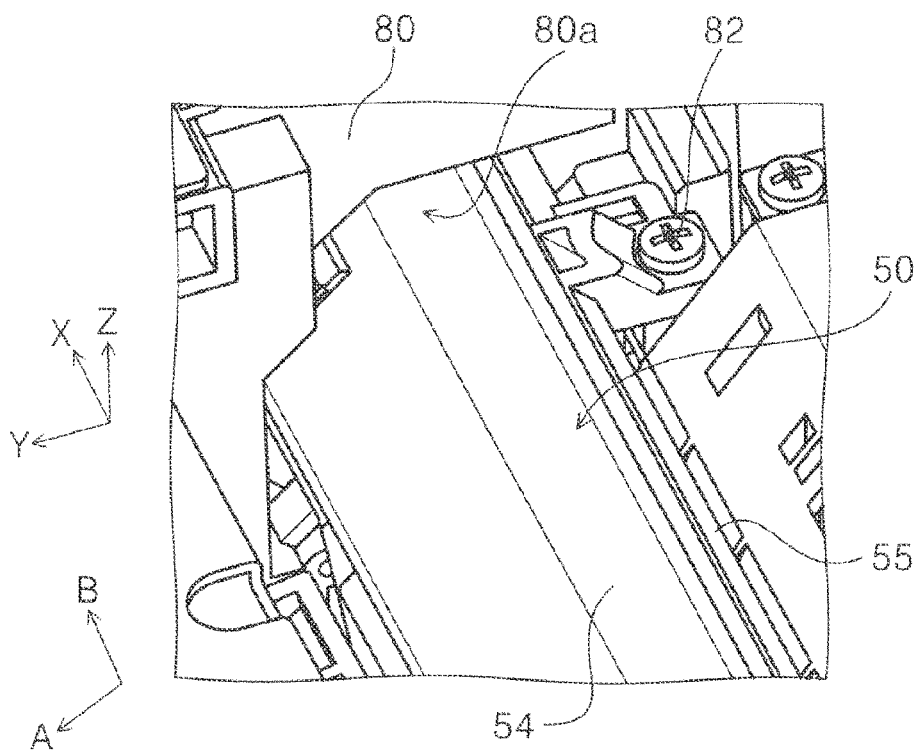
FIGS. 17A and 17B are perspective views showing an opening portion formed in a left frame, where
Figure 17B:
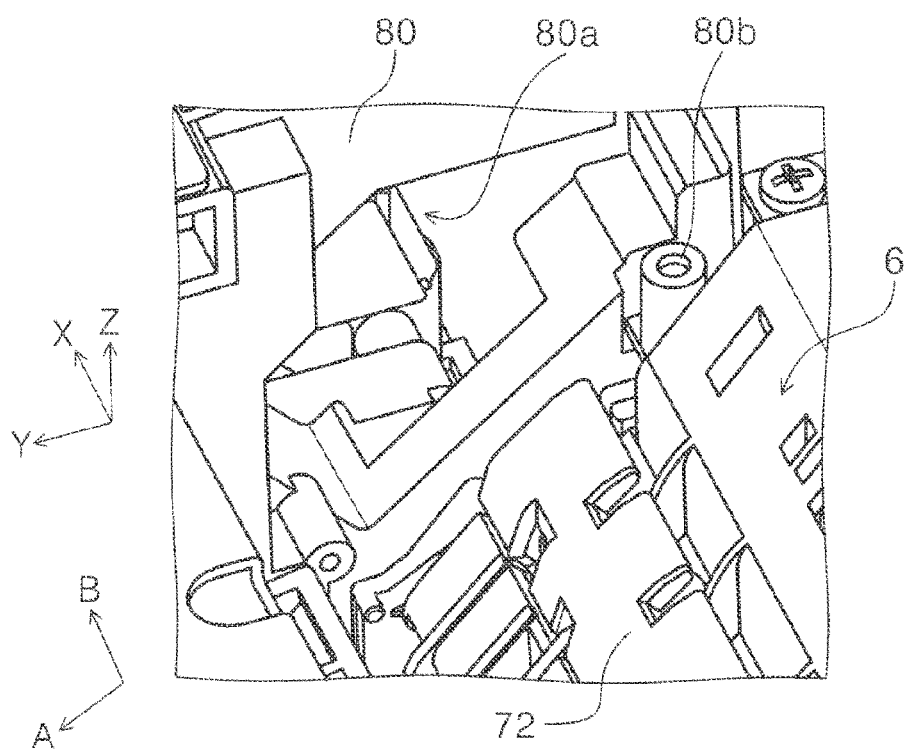

As shown in FIGS. 17A and 17B, on the left frame 80 side, the reading unit 50 is fixed, by means of a screw 82, to a screw hole 80b formed in the left frame 80.

Figure 18A:
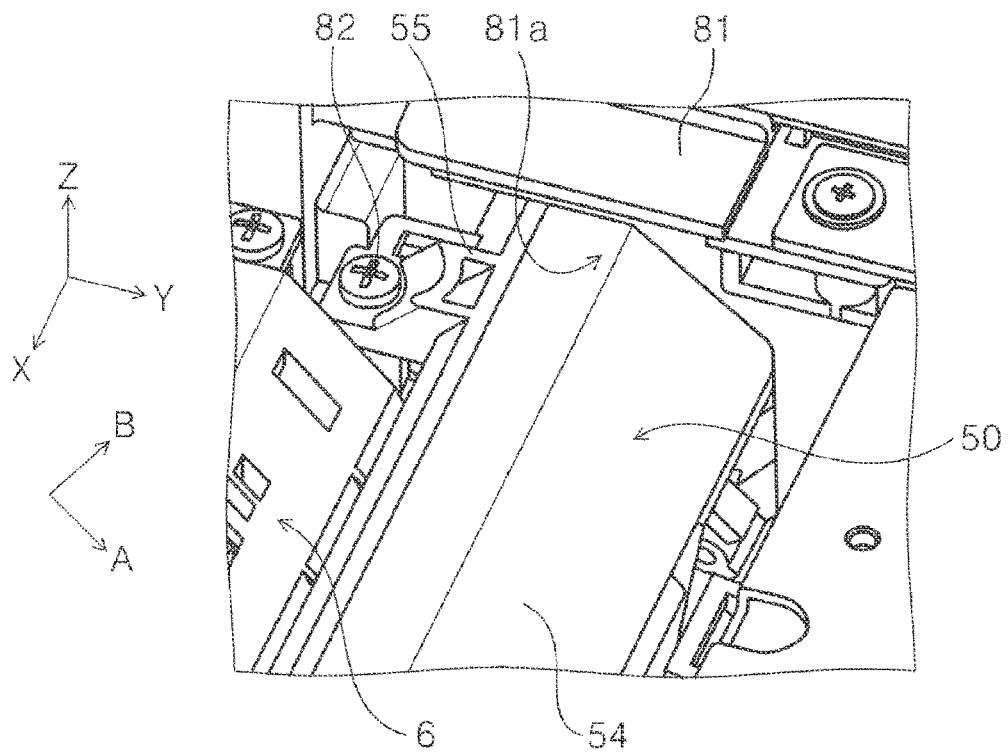
FIGS. 18A and 18B are perspective views showing an opening portion formed in a right frame, where
Figure 18B:
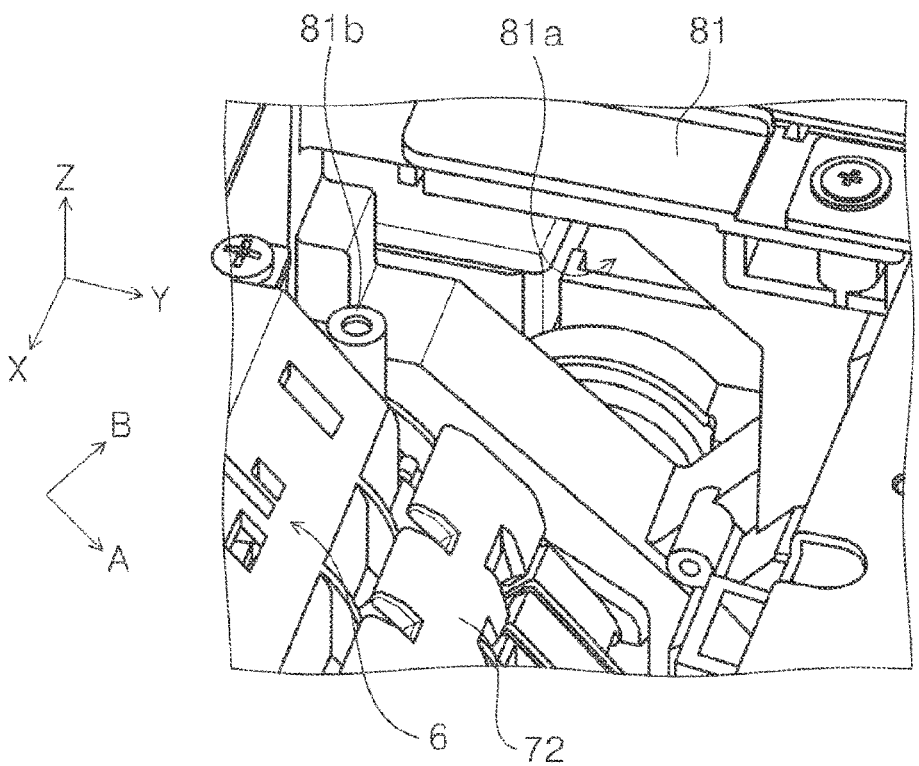

In addition, as shown in FIGS. 18A and 18B, on the right frame 81 side, the reading unit 50 is fixed, by means of the screw 82, to a screw hole 81b formed in the right frame 81.

In the mounted state, the reading unit 50 protrudes from the left frame 80 by a predetermined length in the +X direction and protrudes from the right frame 81 by a predetermined length in the −X direction.

Figure 19:
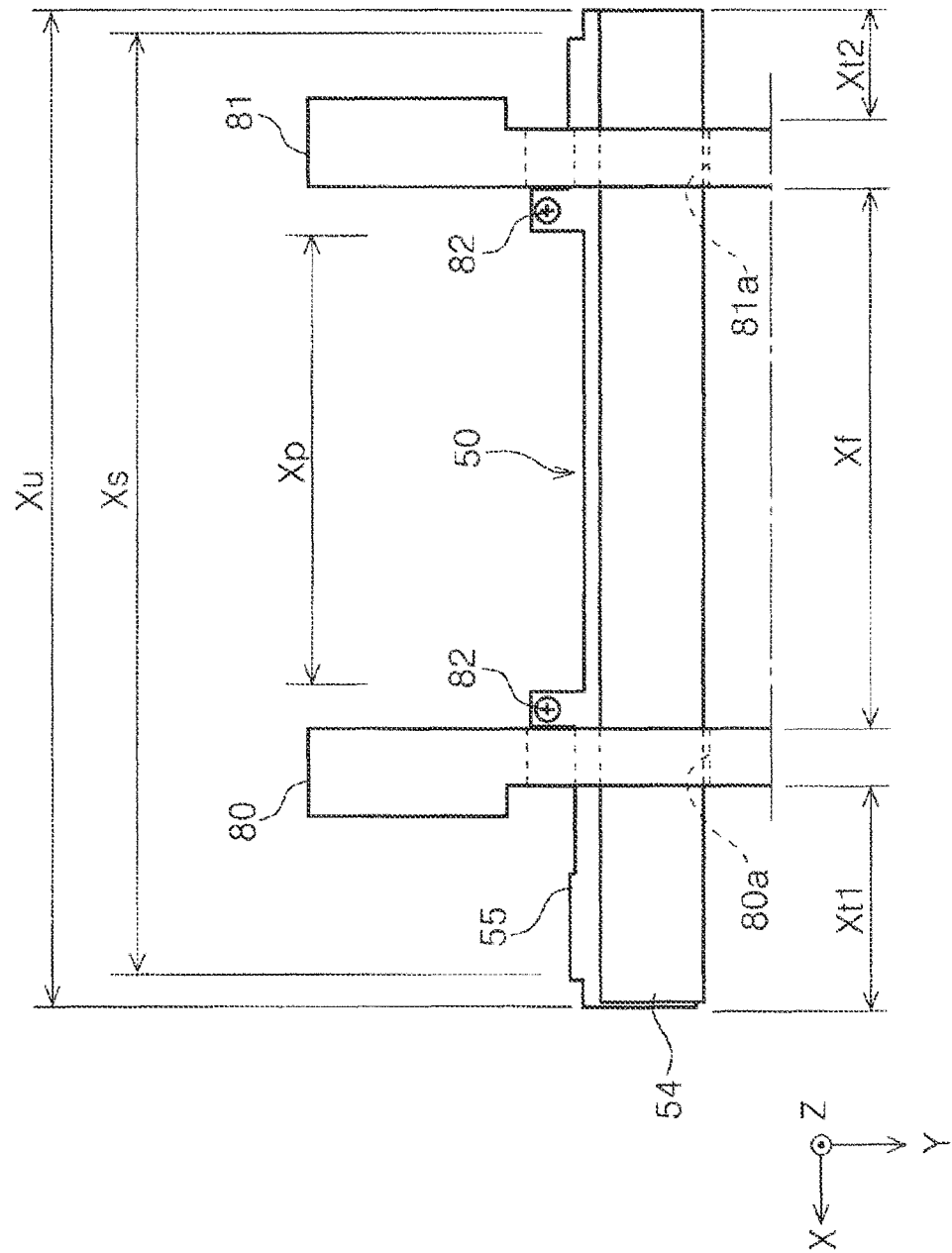
FIG. 19 is a view showing the right frame, the left frame, and the reading unit as seen in a +Z direction.

FIG. 19 shows the position of the reading unit 50 with respect to the left frame 80 and the right frame 81, and for the sake of convenience, the shapes of the left frame 80 and the right frame 81 are slightly simplified. The reading unit 50 protrudes from the left opening portion 80a of the left frame 80 by a length Xt1 in the +X direction. In addition, the reading unit 50 protrudes from the right opening portion 81a of the right frame 81 by a length Xt2 in the −X direction. In the present example, the length Xt1 is larger than the length Xt2. However, the length Xt2 may be larger than the length Xt1. Alternatively, the length Xt1 and the length Xt2 may be the same as each other.

In the present embodiment, a circuit substrate 85 is disposed in a region of the length Xt1 as shown in FIG. 15.

In addition, in FIG. 19, a length Xu is the length of the reading unit 50 in the X-axis direction, and a region Xs is a reading-enabled region of the sensor module 51 (which will be described later) in the X-axis direction. As shown in the drawing, the reading-enabled region Xs also protrudes from the left opening portion 80a of the left frame 80 in the +X direction and protrudes from the right opening portion 81a of the right frame 81 in the −X direction.

In addition, in FIG. 19, a region Xp is a medium transportation region of the reading path T5, that is, a region through which a medium can pass. The size (the length in the X-axis direction) of the medium transportation region Xp is set with a slight margin with respect to a medium having the maximum allowable size.

Next, the configuration of the reading unit 50 will be described in detail. Note that, in the case of the configuration of the reading unit 50 described below, a mounting structure for the reading unit 50 with respect to the left frame 80 and the right frame 81 is not essential.

Figure 20:
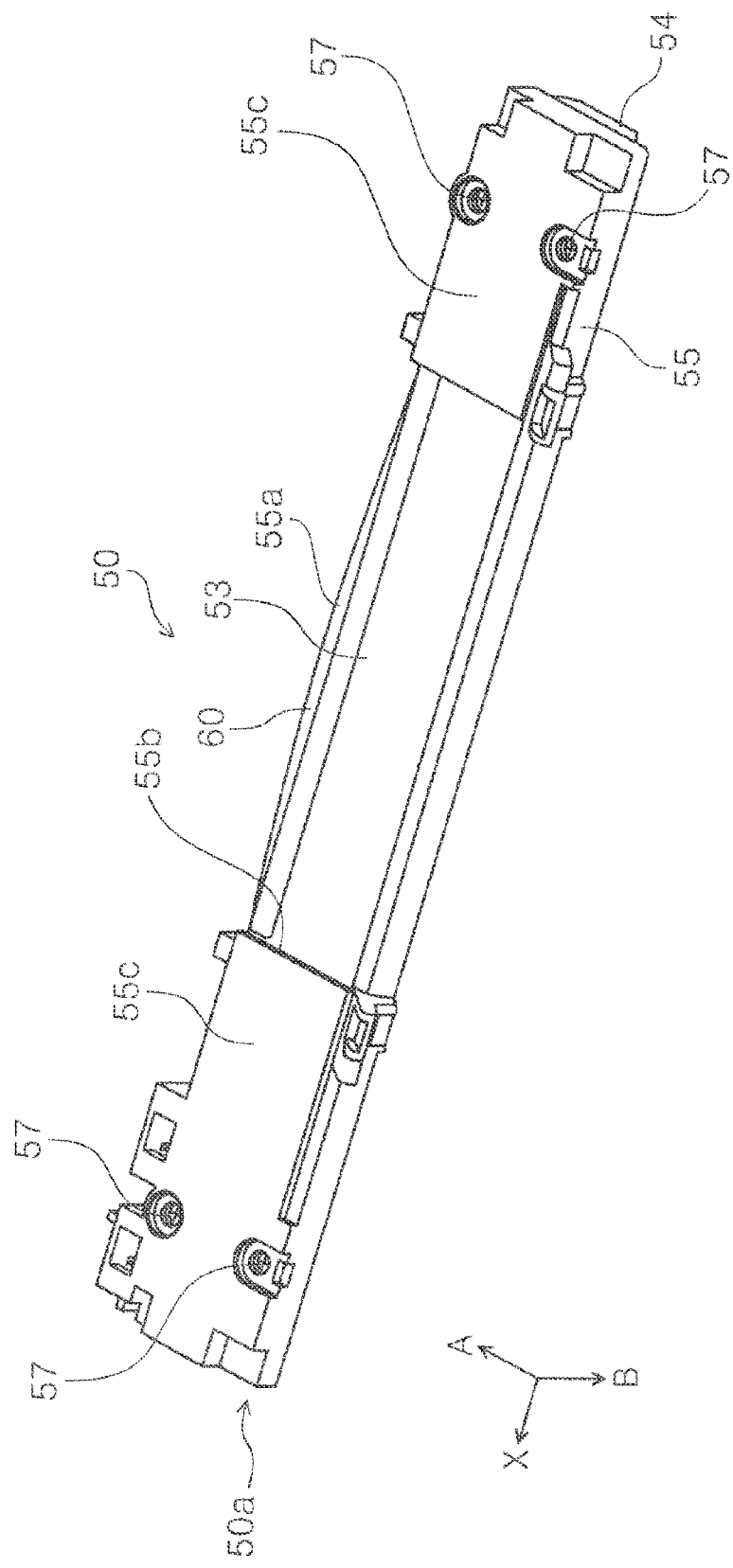
FIG. 20 is a perspective view of the reading unit.

As shown in FIGS. 20 and 21, the reading unit 50 includes the housing structure 50a and the sensor module 51 and the sensor module 51 is accommodated in the housing structure 50a. The detailed description about the configuration of the sensor module 51 will be omitted. The sensor module 51 includes a light receiving element, a light source, a lens array, and the like.

The housing structure 50a includes a first housing member 54, a second housing member 55, and a glass plate 53.

In the present embodiment, the first housing member 54 and the second housing member 55 are formed of a resin material.

The first housing member 54 has a box-like shape to accommodate the sensor module 51, and two screw holes 54b are provided near each of both end portions in the X-axis direction. Screw insertion holes 55e corresponding to the screw holes 54b are formed in the second housing member 55 and the first housing member 54 and the second housing member 55 are fixed to each other when screws 57 are fitted into the screw holes 54b through the screw insertion holes 55e. Note that, as will be described later, the first housing member 54 and the second housing member 55 are fixed by the screws 57 and are bonded to each other via a double-sided tape.

Spring holding portions 54a are formed near both end portions of the first housing member 54 in the X-axis direction, and springs 56, which are examples of pressing members, are held by the spring holding portions 54a. In the present embodiment, the springs 56 are compression coil springs. The sensor module 51 is displaceable in the B-axis direction inside the housing structure 50a, and the springs 65 presses the sensor module 51 in a −B direction, that is, in a direction toward the second housing member 55.

Figure 23:
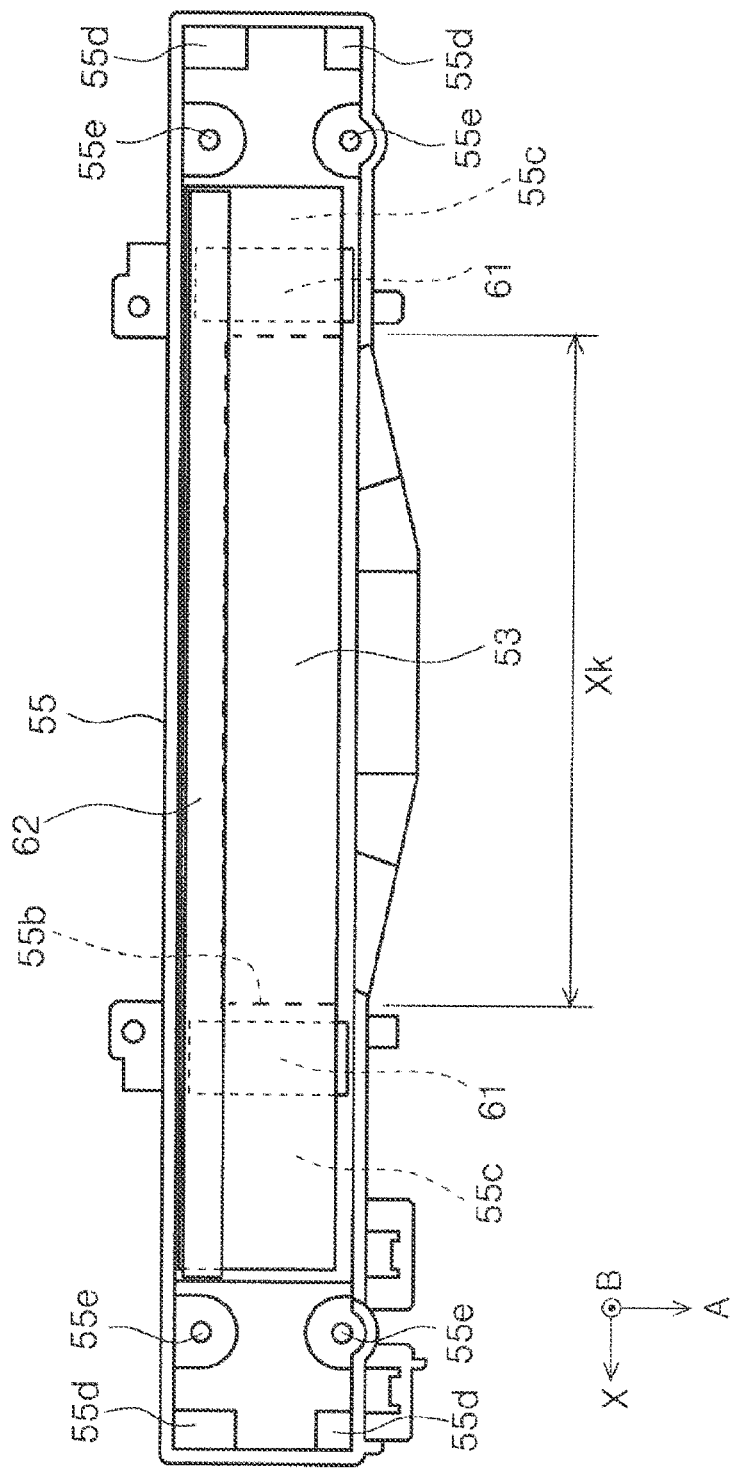
FIG. 23 is a plan view of the inside of a second housing member and a glass plate.
Figure 24A:
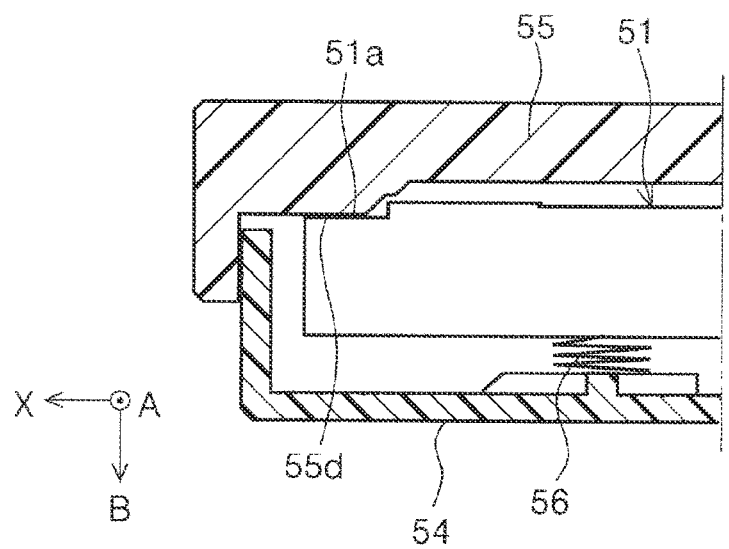
FIGS. 24A and 24B are cross-sectional views of the reading unit cut along an X-B plane, where
Figure 24B:
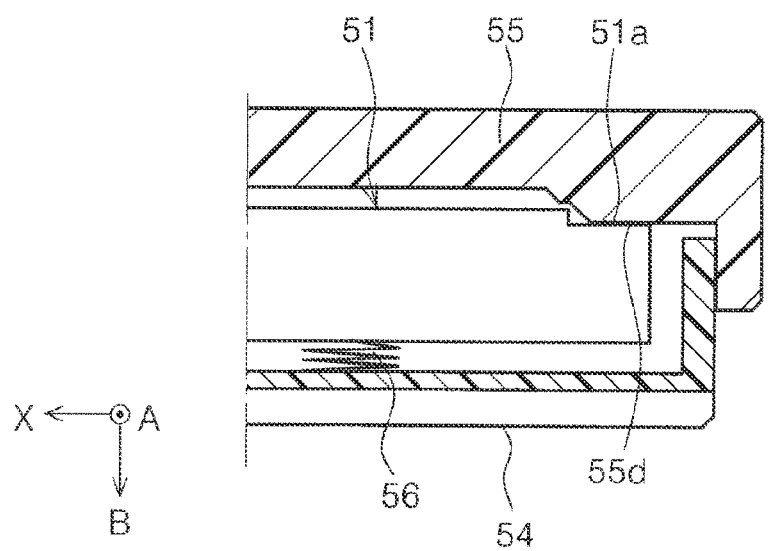

Two sensor-side contact portions 51a are formed at each of both end portions of the sensor module 51 in the X-axis direction. In addition, as shown in FIG. 23, housing-side contact portions 55d are formed on both end portions of the second housing member 55 in the X-axis direction. In addition, as shown in FIGS. 24A and 24B, the sensor-side contact portions 51a are pressed against the housing-side contact portions 55d by a pressing force of the springs 56, so that the position of the sensor module 51 with respect to the second housing member 55 and the glass plate 53 is determined.

The second housing member 55 includes an opening portion 55b, and covering portions 55c are formed with respect to the opening portion 55b in the +X direction and the −X direction, respectively. The covering portions 55c are portions that cover a portion of the reading-enabled region Xs described with reference to FIG. 19.

Figure 22:
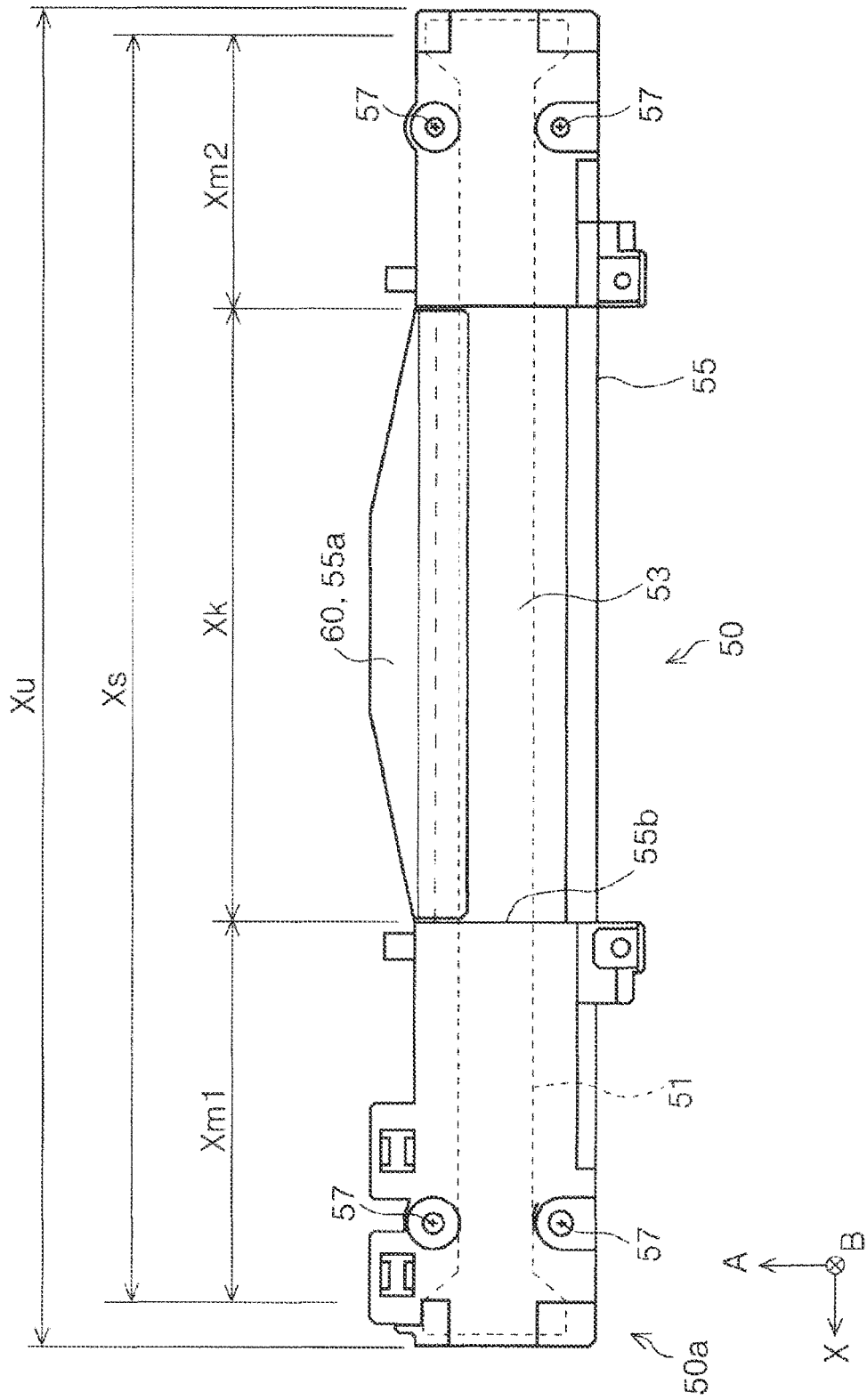
FIG. 22 is a plan view of the reading unit.

In FIG. 22, regions represented by reference numerals "Xm1" and "Xm2" (hereinafter, referred to as "cover regions") are regions of the covering portions 55c in the X-axis direction. The cover region Xm1 is a region where a +X direction side of the reading-enabled region Xs of the sensor module 51 is covered and the cover region Xm2 is a region where a −X direction side of the reading-enabled region Xs of the sensor module 51 is covered.

A region represented by a reference numeral "Xk" is a region out of the reading-enabled region Xs that is not covered by the covering portions 55c, that is, a substantially reading-enabled region. The substantially reading-enabled region Xk is also a region where the glass plate 53 is exposed. The size of the substantially reading-enabled region Xk is substantially equal to that of the medium transportation region Xp or slightly larger than that of the medium transportation region Xp (refer to FIG. 19).

The glass plate 53 is attached to a rear side of the second housing member 55. In FIG. 23, a reference numeral "61" represents a glass plate bonding double-sided tape, and the glass plate 53 is attached to and fixed to the rear side of the second housing member 55 by means of the glass plate bonding double-sided tape 61. The glass plate bonding double-sided tape 61 is attached to rear sides of the covering portions 55c and is disposed to surround the opening portion 55b.

Note that, a housing member bonding double-sided tape 62 is provided between the first housing member 54, the second housing member 55, and the glass plate 53 as shown in FIG. 25, and the housing member bonding double-sided tape 62 bonds the first housing member 54 and the second housing member 55 to each other and bonds the first housing member 54 and the glass plate 53 to each other. Particularly, since the housing member bonding double-sided tape 62 is disposed to cover a gap Bb between the glass plate 53 and the second housing member 55, foreign substances entering the inside of the housing structure 50a via the gap Bb can be suppressed.

Next, a sheet material 60 is attached to the guide portion 55a formed on the second housing member 55. The sheet material 60 is a material of which the coefficient of friction with the medium Pt is lower than the coefficient of friction between the second housing member 55 and the medium Pt, and, for example, a low-friction sheet formed of ultra high molecular weight poly ethylene (PE), poly tetra fluoro ethylene (PTFE), or the like can be used.

Since such a sheet material 60 is attached to the guide portion 55a, the medium Pt fed in the A-axis direction can smoothly proceed in the A-axis direction. Particularly, since the medium Pt can smoothly proceed in the +A direction because of the sheet material 60, improvement in reading accuracy can be achieved.

A portion of the sheet material 60 is interposed between the first housing member 54 and the second housing member 55 as shown with a reference numeral "60a". In addition, the sheet material 60 extends up to a surface of the glass plate 53 so that a gap Ba between the glass plate 53 and the second housing member 55 is covered.

Accordingly, foreign substances entering the inside of the housing structure 50a via the gap Ba can be suppressed.

As described above, the left frame 80 and the right frame 81, which form a pair of frames supporting the reading unit 50, are disposed at an interval in the width direction, and at least one of the left frame 80 and the right frame 81 is provided with an opening portion penetrable by the reading unit 50. In the present embodiment, such an opening portion is formed in both of the frames (the left opening portion 80a and the right opening portion 81a). The left frame 80 and the right frame 81 support the reading unit 50 penetrating the left frame 80 and the right frame 81 while being disposed between the left frame 80 and the right frame 81.

Accordingly, the rigidities of the left frame 80 and the right frame 81 can be secured in comparison with a configuration in which upper portions of the left frame 80 and the right frame 81 are provided with notches and the reading unit 50 is dropped into the notches from above.

In addition, a distance between the left frame 80 and the right frame 81 in the width direction (a distance Xf in FIG. 19) is smaller than the length of the reading unit 50 in the width direction (the length Xu in FIG. 19).

Accordingly, it is possible to suppress an increase in cost in comparison with a configuration in which the reading unit 50 is supported by the left frame 80 and the right frame 81 via another member. In addition, since the distance Xf between the left frame 80 and the right frame 81 can be shortened within a range in which the medium can be transported, it is possible to contribute to reduction in apparatus size.

In addition, in the present embodiment, since the opening portion that the reading unit 50 penetrates is provided in both the left frame 80 and the right frame 81 (the left opening portion 80a and the right opening portion 81a), the posture of the reading unit 50 is stabilized. Note that a configuration may also be adopted in which at least one of the frames is provided with an opening portion and the other of the frames is provided with a recess portion into which an end of the reading unit 50 is inserted. That is, the one of the frames may be provided with a through-hole and the other of the frames may be provided with a non-through hole.

In addition, the reading unit 50 includes the sensor module 51 reading a medium and the size, in the width direction, of a medium readable by the sensor module 51 (the length of the reading-enabled region Xs in FIG. 19) is larger than that of the medium transportation region (the medium transportation region Xp in FIG. 19) in the medium transportation path. Here, the size of a medium readable by the sensor module 51 (the length of the reading-enabled region Xs in FIG. 19) is the size of a medium readable before the sensor module 51 is mounted on the apparatus main body 2.

According to such a configuration, the size of the sensor module 51 does not need to match the medium transportation region Xp. Accordingly, the degree of freedom in selecting the sensor module 51 is improved, the cost of the sensor module 51 can be suppressed, and thus it is possible to contribute a decrease in cost of the entire apparatus.

For example, as the sensor module 51, a sensor module that is the cheapest and most widely available can be used.

However, in the width direction, the size of a medium readable by the sensor module 51 may be the same as that of the medium transportation region Xp and the size of a medium readable by the sensor module 51 may be smaller than that of the medium transportation region Xp. That is, any size may be adopted as long as the above-described nozzle check pattern CP has a readable size.

In addition, the reading unit 50 includes the housing structure 50*a* accommodating the sensor module 51, and the housing structure 50*a* includes the glass plate 53 interposed between the reading path T5 and the sensor module 51, the first housing member 54 holding the sensor module 51, and the second housing member 55 that is a member facing the first housing member 54 and that holds the glass plate 53. Since the sensor module 51 is accommodated in such a housing structure 50*a*, a decrease in reading accuracy caused by adhesion of foreign substances to the sensor module 51 can be suppressed.

In addition, the second housing member 55 includes the housing-side contact portions 55*d* that can come into contact with the reading unit 50 and the sensor module 51 is accommodated to be movable forward and backward with respect to the housing-side contact portions 55*d* and is pressed against the housing-side contact portions 55*d* by the springs 56. Accordingly, the position of the sensor module 51 with respect to the second housing member 55 (that is, the glass plate 53) is stabilized and there is improvement in reading accuracy.

In addition, the second housing member 55 includes the covering portions 55*c* covering a region that is a portion of the sensor module 51 in the width direction and that is outside the medium transportation region (the medium transportation region Xp in FIG. 19) in the medium transportation path. Accordingly, the area of the glass plate 53 can be made small and it is possible to suppress an increase in cost.

As shown in FIG. 23, the covering portions 55*c* partially overlap with the glass plate 53 as seen in the normal direction (the B-axis direction) of a surface of the glass plate 53. According to such a configuration, foreign substances entering the inside of the housing structure 50*a* via a gap between the glass plate 53 and the covering portions 55*c* can be suppressed.

However, the covering portions 55*c* may not partially overlap with the glass plate 53 as seen in the normal direction (the B-axis direction) of the surface of the glass plate 53.

In addition, as described with reference to FIG. 25, the second housing member 55 and the glass plate 53 are bonded to each other by means of the glass plate bonding double-sided tape 61 and at least a portion of the glass plate bonding double-sided tape 61 is interposed between the covering portions 55*c* and the glass plate 53. Accordingly, foreign substances entering the inside of the housing structure 50*a* via a gap between the glass plate 53 and the covering portions 55*c* can be suppressed.

However, the second housing member 55 and the glass plate 53 may be bonded to each other by means of an adhesive instead of a double-sided tape.

In addition, since the first housing member 54 and the second housing member 55 are bonded to each other by means of the housing member bonding double-sided tape 62 as described with reference to FIG. 25, the first housing member 54 and the second housing member 55 can be easily bonded to each other and foreign substances entering the inside of the housing structure 50*a* via a gap between the first housing member 54 and the second housing member 55 can be suppressed.

Note that, in the present embodiment, the second housing member 55 is fixed to the first housing member 54 by means of the screws 57 (refer to FIG. 20) and the housing member bonding double-sided tape 62. However, the second housing member 55 may be fixed by means of only one of the double-sided tape and the screws.

In addition, since the second housing member 55 includes the guide portion 55*a* that guides a medium to a position where the medium is read by the sensor module 51, passage can be made smoothly when the medium passes through the position of the second housing member 55. In addition, since the guide portion 55*a* is provided with the sheet material 60 of which the coefficient of friction with the medium is lower than that of the second housing member 55, passage can be made further smoothly when the medium passes through the position of the second housing member 55.

Note that, the guide portion 55*a* may be formed of a low-friction material such as polyoxymethylene (POM) instead of being provided with the sheet material 60.

In addition, since a portion of the sheet material 60 is interposed between the first housing member 54 and the second housing member 55 as described with reference to FIG. 25, the sheet material 60 falling off from the second housing member 55 can be suppressed.

In addition, since a portion of the sheet material 60 covers the gap Ba between the second housing member 55 and the glass plate 53 as described with reference to FIG. 25, foreign substances entering the inside of the housing structure 50*a* via the gap Ba can be suppressed. Note that, in the present example, the sheet material 60 covers almost the entire gap Ba in the X-axis direction. However, the sheet material 60 may cover a portion of the gap Ba in the X-axis direction.

As described above, the reading unit 50 is a reading unit that penetrates the left frame 80 and the right frame 81 via an opening portion formed in at least one of the left frame 80 and the right frame 81 while being disposed between the left frame 80 and the right frame 81 so as to be supported by the left frame 80 and the right frame 81 and that reads a medium transported along the reading path T5 in the printer 1 including the left frame 80 and the right frame 81 that are disposed at an interval in the width direction. In addition, the reading unit 50 includes the sensor module 51 larger than the medium transportation region Xp in the reading path T5 and the housing structure 50a accommodating the sensor module 51. The housing structure 50a includes the glass plate 53 interposed between the reading path T5 and the sensor module 51, the first housing member 54 holding the sensor module 51, and the second housing member 55 that is a member facing the first housing member 54 and that holds the glass plate 53, and the second housing member 55 includes the covering portions 55c covering a region that is a portion of the sensor module 51 in the width direction and that is outside the medium transportation region Xp in the reading path T5.

Accordingly, the area of the glass plate 53 can be made small and it is possible to suppress an increase in cost.

The present disclosure is not limited to the embodiment and modification examples described above, various modifications can be made within the scope of the disclosure described in the claims, and it is a matter of course that the modifications are also included in the scope of the present disclosure.

What is claimed is:

1. A recording apparatus comprising:
a recorder performing recording on a medium;
a medium transportation path through which the medium after the recording performed thereon by the recorder is transported;
a reading unit that is a unit extending in a width direction intersecting a medium transportation direction of the medium transported through the medium transportation path and that reads the medium transported through the medium transportation path; and
a pair of frames supporting the reading unit, wherein
the pair of frames includes a first frame and a second frame that is disposed with an interval provided between the first frame and the second frame in the width direction,
the reading unit includes a housing structure accommodating a reading sensor, which reads the medium,
at least one of the first frame and the second frame is provided with an opening portion penetrable by at least a part of the housing structure,
the first frame and the second frame support the housing structure, which passes through the opening portion, to be disposed between the first frame and the second frame, and
a size of the opening portion allows the housing structure to pass through along the width direction withe the reading sensor from one end in a longitudinal direction of the reading unit.

2. The recording apparatus according to claim 1, wherein a distance between the first frame and the second frame in the width direction is smaller than a length of the reading unit in the width direction.

3. The recording apparatus according to claim 2, wherein both of the first frame and the second frame are provided with the opening portion.

4. The recording apparatus according to claim 3, wherein the reading unit includes a reading sensor reading a medium, and
a size, in the width direction, of a medium readable by the reading sensor is larger than that of a medium transportation region in the medium transportation path.

5. The recording apparatus according to claim 4, wherein the housing structure includes
a glass plate interposed between the medium transportation path and the reading sensor,
a first housing member holding the reading sensor, and
a second housing member that is a member facing the first housing member and that holds the glass plate.

6. The recording apparatus according to claim 5, wherein the second housing member includes a contact portion configured to come into contact with the reading unit, and
the reading sensor is accommodated to be movable forward and backward with respect to the contact portion and is pressed against the contact portion by a pressing member.

7. The recording apparatus according to claim 5, wherein the second housing member includes a covering portion covering a region that is a portion of the reading sensor in the width direction and that is outside the medium transportation region in the medium transportation path.

8. The recording apparatus according to claim 7, wherein a portion of the covering portion overlaps with a portion of the glass plate as seen in a normal direction of a surface of the glass plate.

9. The recording apparatus according to claim 8, wherein the second housing member and the glass plate are bonded to each other by means of a glass plate bonding double-sided tape, and
at least a portion of the glass plate bonding double-sided tape is interposed between the covering portion and the glass plate.

10. The recording apparatus according to claim 5, wherein the first housing member and the second housing member are bonded to each other by means of a housing member bonding double-sided tape.

11. The recording apparatus according to claim 5, wherein the second housing member includes a guide portion guiding a medium to a position where the medium is read by the reading sensor, and
the guide portion is provided with a sheet material of which a coefficient of friction with the medium is lower than that of the second housing member.

12. The recording apparatus according to claim 11, wherein
a portion of the sheet material is interposed between the first housing member and the second housing member.

13. The recording apparatus according to claim 11, wherein
a portion of the sheet material covers at least a portion of a boundary between the second housing member and the glass plate.

14. The recording apparatus according to claim 3, wherein the housing structure has a first end portion and a second end portion,
the first frame and the second frame support the housing structure, which one of the first end portion and the second end portion pass through both the opening portion of the first frame and the opening portion of the second frame along the width direction.

15. The recording apparatus according to claim 1, wherein the recorder is configured to record a recorded image used to check a state of liquid ejection by ejecting liquid on a medium, and
the reading unit reads the medium with the recorded image recorded thereon.

16. The recording apparatus according to claim 15, wherein
the medium transportation path is as a reading path, and the recording apparatus further comprises, separately from the reading path, a recording path that is a path for transportation of a medium and that passes the recorder, a feeding path that is a path coupled to the recording path and through which the medium is fed to the recording path, and a discharge path that is a path coupled to the recording path and through which the medium after recording performed thereon by the recorder is discharged.

17. A recording apparatus comprising:

a recorder performing recording on a medium;

a medium transportation path through which the medium after the recording performed thereon by the recorder is transported;

a reading unit that is a unit extending in a width direction intersecting a medium transportation direction of the medium transported through the medium transportation path and that reads the medium transported through the medium transportation path; and a pair of frames supporting the reading unit, wherein the pair of frames includes a first frame and a second frame that is disposed with an interval provided between the first frame and the second frame in the width direction, the reading unit includes a housing structure accommodating a reading sensor, which read the medium, at least one of the first frame and the second frame is provided with an opening portion penetrable by at least a part of the housing structure, the first frame and the second frame support the housing structure, which passes through the opening portion to be disposed between the first frame and the second frame, and the opening portion is provided so as to surround the reading unit on all sides when viewed from the width direction.

* * * * *